US012389949B2

(12) United States Patent
Lee

(10) Patent No.: US 12,389,949 B2
(45) Date of Patent: Aug. 19, 2025

(54) AEROSOL GENERATING DEVICE INCLUDING AN ELECTRODE

(71) Applicant: KT&G CORPORATION, Daejeon (KR)

(72) Inventor: Jaemin Lee, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 622 days.

(21) Appl. No.: 17/631,158

(22) PCT Filed: Jul. 6, 2021

(86) PCT No.: PCT/KR2021/008567
§ 371 (c)(1),
(2) Date: Jan. 28, 2022

(87) PCT Pub. No.: WO2022/025467
PCT Pub. Date: Feb. 3, 2022

(65) Prior Publication Data

US 2022/0264957 A1 Aug. 25, 2022

(30) Foreign Application Priority Data

Jul. 31, 2020 (KR) ........................ 10-2020-0096398
Jun. 25, 2021 (KR) ........................ 10-2021-0083117

(51) Int. Cl.
*A24F 40/53* (2020.01)
*A24F 40/20* (2020.01)
(Continued)

(52) U.S. Cl.
CPC .............. *A24F 40/53* (2020.01); *A24F 40/20* (2020.01); *A24F 40/465* (2020.01); *A24F 40/51* (2020.01);
(Continued)

(58) Field of Classification Search
None
See application file for complete search history.

(56) References Cited

U.S. PATENT DOCUMENTS 10,687,553 B2 6/2020 Kaufman et al.
2017/0071253 A1 3/2017 Revell
(Continued)

FOREIGN PATENT DOCUMENTS

CN 108463128 A 8/2018
CN 108471811 A 8/2018
(Continued)

OTHER PUBLICATIONS

KR20190089908A, Aerosol-generating system with electrode pair, (Year: 2019).*
(Continued)

*Primary Examiner* — Manley L Cummins, IV
(74) *Attorney, Agent, or Firm* — Sughrue Mion, PLLC

(57) ABSTRACT

Provided is an aerosol generating device including: a heater, a housing including an accommodation portion into which an aerosol generating article is inserted, an electrode apart from the aerosol generating article inserted into the accommodation portion and located to correspond to at least a part of the aerosol generating article, and a processor electrically connected to the heater and the electrode. In addition, various embodiments identified through the specification are possible.

15 Claims, 46 Drawing Sheets

(51) Int. Cl.

| | |
|---|---|
| ***A24F 40/465*** | (2020.01) |
| ***A24F 40/51*** | (2020.01) |
| ***A24F 40/57*** | (2020.01) |
| ***A24F 40/85*** | (2020.01) |
| ***H05B 6/10*** | (2006.01) |

(52) U.S. Cl.
CPC .............. *A24F 40/57* (2020.01); *A24F 40/85* (2020.01); *H05B 6/105* (2013.01)

(56) References Cited

U.S. PATENT DOCUMENTS

| | | | | |
|---|---|---|---|---|
| 2017/0150758 | A1 | 6/2017 | Fernando et al. | |
| 2017/0188634 | A1 | 7/2017 | Plojoux et al. | |
| 2017/0231276 | A1 | 8/2017 | Mironov et al. | |
| 2017/0231278 | A1 | 8/2017 | Mironov et al. | |
| 2018/0049469 | A1 | 2/2018 | Kaufman et al. | |
| 2018/0206553 | A1* | 7/2018 | Reevell | A24F 40/50 |
| 2018/0242644 | A1 | 8/2018 | Bessant et al. | |
| 2018/0338537 | A1 | 11/2018 | Yan et al. | |
| 2019/0261683 | A1* | 8/2019 | Reevell | A24F 40/40 |
| 2020/0093185 | A1 | 3/2020 | Lim | |
| 2020/0154766 | A1 | 5/2020 | Jeong | |
| 2020/0260790 | A1 | 8/2020 | Kaufman et al. | |
| 2020/0359699 | A1* | 11/2020 | Lee | A24F 40/60 |
| 2020/0367568 | A1* | 11/2020 | Lim | G01R 27/26 |
| 2021/0007393 | A1 | 1/2021 | Jung et al. | |
| 2021/0106051 | A1 | 4/2021 | Han et al. | |
| 2021/0127757 | A1 | 5/2021 | Lee et al. | |
| 2021/0169145 | A1 | 6/2021 | Lee et al. | |
| 2021/0199432 | A1 | 7/2021 | Bessant et al. | |
| 2023/0301364 | A1 | 9/2023 | Mironov et al. | |

FOREIGN PATENT DOCUMENTS

| | | | | | |
|---|---|---|---|---|---|
| CN | 110022705 | A | | 7/2019 | |
| CN | 110475488 | A | | 11/2019 | |
| CN | 110662438 | A | | 1/2020 | |
| JP | 2014-500017 | A | | 1/2014 | |
| JP | 2015-508287 | A | | 3/2015 | |
| JP | 2018-534913 | A | | 11/2018 | |
| JP | 2019-511207 | A | | 4/2019 | |
| KR | 10-2002-0034583 | A | | 5/2002 | |
| KR | 10-2016-0124853 | A | | 10/2016 | |
| KR | 10-2016-0139380 | A | | 12/2016 | |
| KR | 10-2016-0139381 | A | | 12/2016 | |
| KR | 10-2019-0089908 | A | | 7/2019 | |
| KR | 2019089908 | A | * | 7/2019 | A24F 40/10 |
| KR | 10-2020-0005078 | A | | 1/2020 | |
| KR | 10-2020-0016679 | A | | 2/2020 | |
| KR | 10-2020-0038050 | A | | 4/2020 | |
| KR | 2020038050 | A | * | 4/2020 | A24F 47/008 |
| KR | 10-2020-0061233 | A | | 6/2020 | |
| KR | 10-2020-0088655 | A | | 7/2020 | |
| RU | 2 656 195 | C2 | | 5/2018 | |
| WO | 2017/137512 | A1 | | 8/2017 | |
| WO | 2018/114849 | A1 | | 6/2018 | |
| WO | 2019/185715 | A1 | | 10/2019 | |
| WO | 2019/185747 | A1 | | 10/2019 | |
| WO | 2019/197170 | A1 | | 10/2019 | |
| WO | 2020/149503 | A1 | | 7/2020 | |

OTHER PUBLICATIONS

KR20200038050A, Fine Particle Generator, (Year: 2020).*

International Search Report for PCT/KR2021/008567, dated Oct. 15, 2021.

Korean Office Action issued Jan. 11, 2024 in Application No. 10-2021-0083117.

Extended European Search Report dated Mar. 21, 2023 in European Application No. 21849166.0.

Japanese Office Action dated Mar. 22, 2023 in Japanese Application No. 2022-525107.

Russian Office Action dated May 26, 2023 in Russian Application No. 2022116656/03.

Communication dated Nov. 24, 2022, issued in European Application No. 21849166.0.

Communication dated Sep. 2, 2023, issued in Korean Application No. 10-2021-0083117.

Communication dated Nov. 7, 2023, issued in Korean Application No. 10-2021-0083117.

Communication dated Sep. 6, 2024, issued in Chinese Application No. 202180006678.9.

Office Action issued May 31, 2025 in Chinese Patent Application No. 202180006678.9.

* cited by examiner

AEROSOL GENERATING DEVICE INCLUDING AN ELECTRODE

CROSS REFERENCE TO RELATED APPLICATIONS

This application is a National Stage of International Application No. PCT/KR2021/008567 filed Jul. 6, 2021, claiming priority based on Korean Patent Application No. 10-2020-0096398 filed Jul. 31, 2020 and Korean Patent Application No. 10-2021-0083117 filed Jun. 25, 2021.

TECHNICAL FIELD

One or more embodiments relate to an aerosol generating device including an electrode, and more particularly, to an aerosol generating device in which a change in charge amounts of an electrode according to permittivity of an aerosol generating article is detected so that various types of controls may be performed.

BACKGROUND ART

Recently, the demand for alternative methods to overcome the shortcomings of general cigarettes has increased. For example, there is increasing demand for a method of generating aerosol with a non-combustion method by heating an aerosol generating material in a cigarette. Thus, research on a heating type cigarette and a heating type aerosol generating device has been actively carried out.

DESCRIPTION OF EMBODIMENTS

Technical Problem

One or more embodiments of the present disclosure provide an aerosol generating device in which a change in charge amounts of an electrode according to permittivity of an aerosol generating article is detected so that various types of controls may be performed.

Technical goals to be achieved by embodiments of the present disclosure are not limited to the above-described goals, and goals that are not mentioned will be clearly understood by one of ordinary skill in the art from the present specification and the accompanying drawings.

Solution to Problem

According to an aspect of the present disclosure, an aerosol generating device includes a heater, a housing including an accommodation portion into which an aerosol generating article is inserted, an electrode apart from the aerosol generating article inserted into the accommodation portion and located to correspond to at least a part of the aerosol generating article, and a processor electrically connected to the heater and the electrode.

Advantageous Effects of Disclosure

According to one or more embodiments of the present disclosure, it may be detected whether an aerosol generating article is inserted regardless of the type of a wrapping material for wrapping at least a portion of the aerosol generating article.

According to one or more embodiments of the present disclosure, a design for other components may be eased as one electrode measures a change in charge amount caused by the insertion of the aerosol generating article.

According to one or more embodiments of the present disclosure, as the generation amount of aerosol is directly detected through the permittivity of the aerosol, the accuracy of data on the generation amount of aerosol and a user's puff operation may be enhanced.

MODE OF DISCLOSURE

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, an aerosol generating device may be a device that generates aerosol by using an aerosol generating material so as to generate aerosol that may be directly inhaled into a user's lung through the user's mouth. For example, the aerosol generating device may be a holder.

In the specification, "puff" refers to the user's inhalation, and inhalation may refer to an action of drawing through the user's mouth or noise into the user's mouth, nasal cavity, or lungs.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
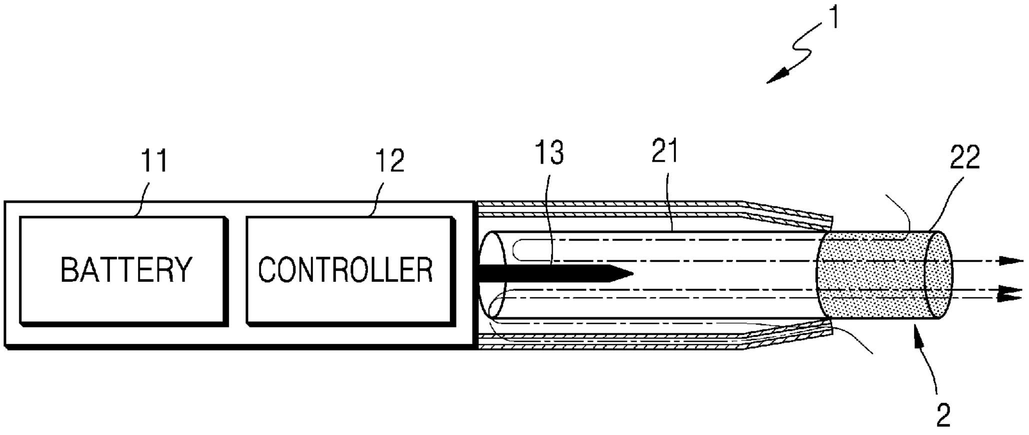
FIGS. 1 through 3 are views illustrating examples in which an aerosol generating article is inserted into an aerosol generating device.
Figure 2:
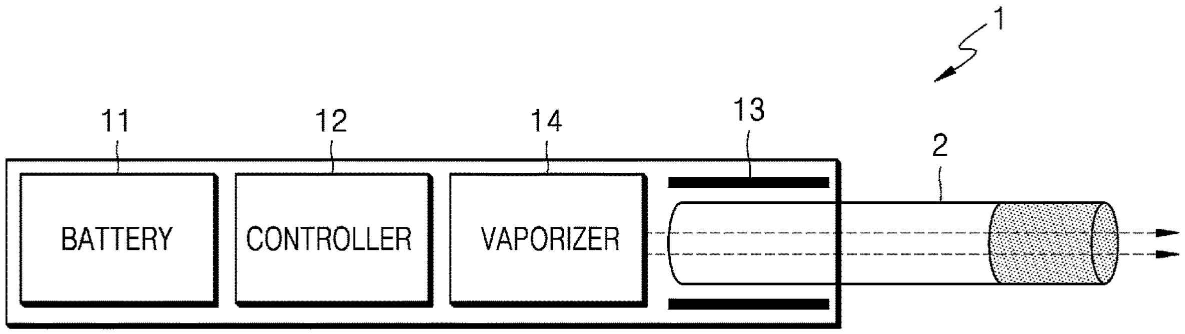
Figure 3:
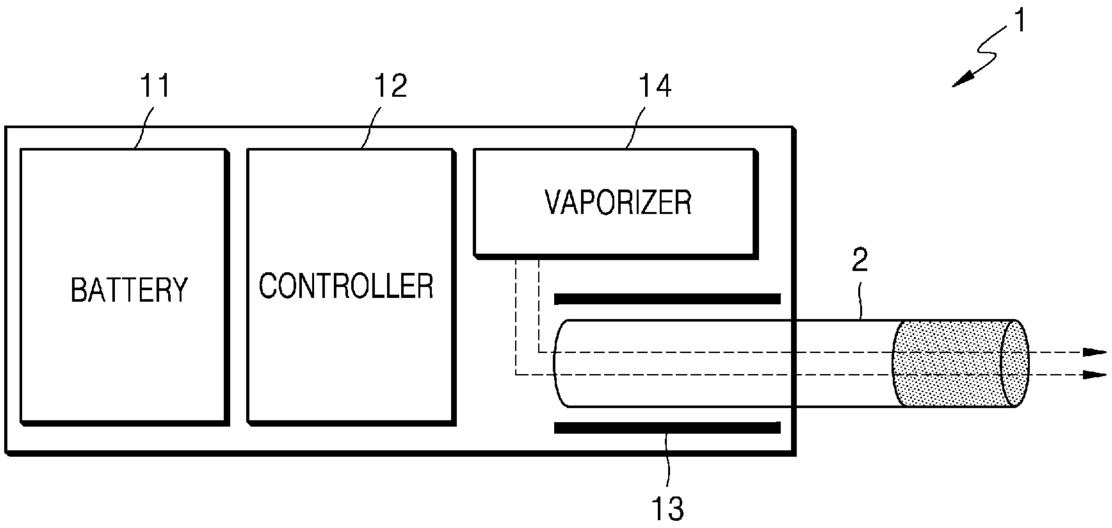

FIGS. 1 through 3 are diagrams showing examples in which an aerosol generating article is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the aerosol generating article 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the aerosol generating article 2 is inserted into the aerosol generating device 1, the aerosol generating device 1 may operate the heater 13 and/or the vaporizer 14 to generate aerosol from the aerosol generating article 2 and/or the vaporizer 14. The aerosol generated by the heater 13 and/or the vaporizer 14 is delivered to a user by passing through the aerosol generating article 2.

As necessary, even when the aerosol generating article 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the aerosol generating article 2 is inserted into the aerosol generating device 1, the heater 13 may be located outside the aerosol generating article 2. Thus, the heated heater 13 may increase a temperature of an aerosol generating material in the aerosol generating article 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set by a user.

As another example, the heater 13 may include an induction heater. In detail, the heater 13 may include an electrically conductive coil for heating an aerosol generating article in an induction heating method, and the aerosol generating article may include a susceptor which may be heated by the induction heater.

For example, the heater 13 may include a tube-type heating element, a plate-type heating element, a needle-type heating element, or a rod-type heating element, and may heat the inside or the outside of the aerosol generating article 2, according to the shape of the heating element.

Also, the aerosol generating device 1 may include a plurality of heaters 13. Here, the plurality of heaters 13 may be inserted into the aerosol generating article 2 or may be arranged outside the aerosol generating article 2. Also, some of the plurality of heaters 13 may be inserted into the aerosol generating article 2 and the others may be arranged outside the aerosol generating article 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the aerosol generating article 2 to be delivered to a user. In other words, the aerosol generated via the vaporizer 14 may move along an air flow passage of the aerosol generating device 1 and the air flow passage may be configured such that the aerosol generated via the vaporizer 14 passes through the aerosol generating article 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (a puff sensor, a temperature sensor, an aerosol generating article insertion detecting sensor, etc.). Also, the aerosol generating device 1 may be formed as a structure that, even when the aerosol generating article 2 is inserted into the aerosol generating device 1, may introduce external air or discharge internal air.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The aerosol generating article 2 may be similar to a general combustive cigarette. For example, the aerosol generating article 2 may be divided into a first portion including an aerosol generating material and a second portion including a filter, etc. Alternatively, the second portion of the aerosol generating article 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage formed in the aerosol generating device 1 may be adjusted by the user. Accordingly, the amount and the quality of smoking may be adjusted by the user. As another example, the external air may flow into the aerosol generating article 2 through at least one hole formed in a surface of the aerosol generating article 2.

Hereinafter, the examples of the aerosol generating article 2 will be described with reference to FIGS. 4 and 5.

Figure 4:
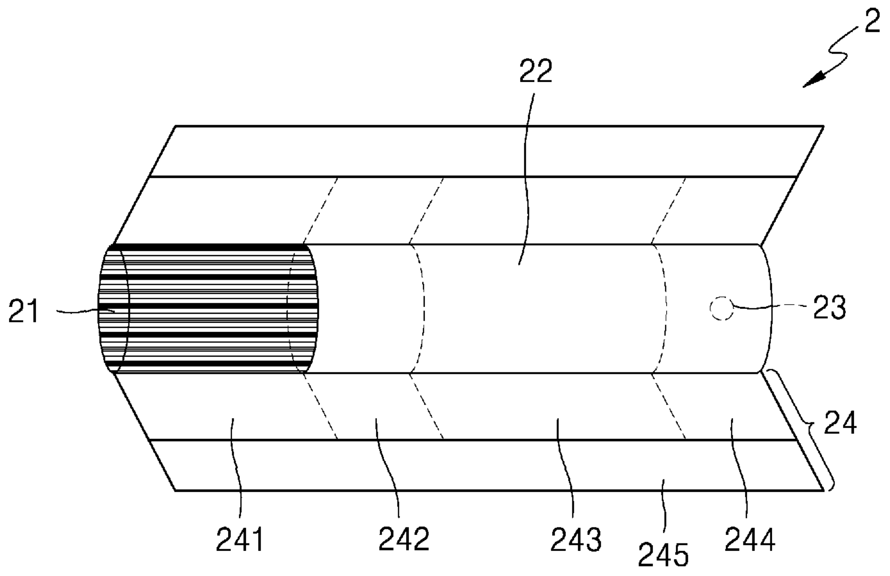
FIGS. 4 and 5 are views illustrating examples of the aerosol generating article.
Figure 5:
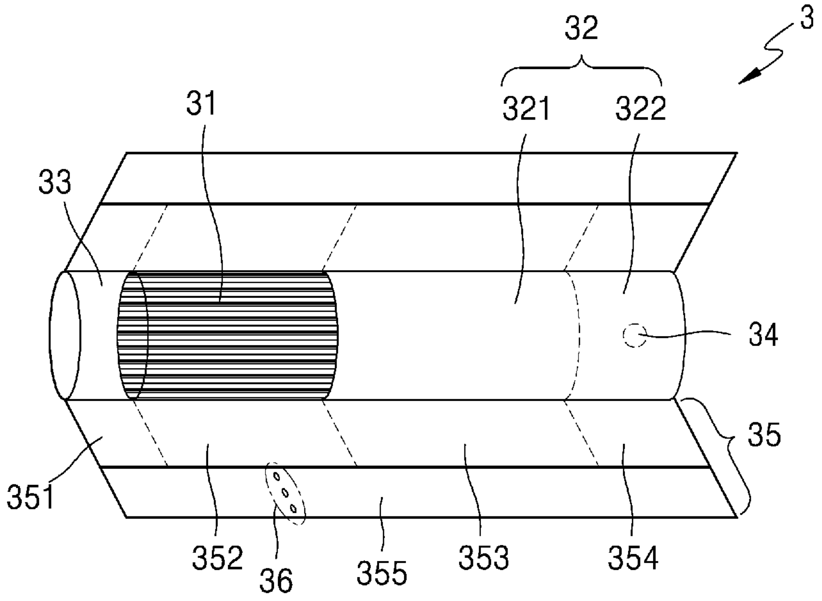

FIGS. 4 and 5 illustrate examples of the aerosol generating article.

Referring to FIG. 4, the aerosol generating article 2 may include a tobacco rod 21 and a filter rod 22. The first portion described above with reference to FIGS. 1 through 3 may include the tobacco rod 21, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The aerosol generating article 2 may be packaged using at least one wrapper 24. The wrapper 24 may have at least one hole through which external air may be introduced or internal air may be discharged. For example, the aerosol generating article 2 may be packaged by one wrapper 24. As another example, the aerosol generating article 2 may be doubly packaged by two or more wrappers 24. For example, the tobacco rod 21 may be packaged by a first wrapper 241, and the filter rod 22 may be packaged by wrappers 242, 243, 244. Also, the entire aerosol generating article 2 may be re-packaged by another single wrapper 245. When the filter rod 22 includes a plurality of segments, each segment may be packaged by wrappers 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat conductive material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 5, the aerosol generating article 3 may further include a front-end plug 33. The front-end plug 33 may be located on one side of the tobacco rod 31 which is opposite to the filter rod 32. The front-end plug 33 may prevent the tobacco rod 31 from being detached outwards and prevent the liquefied aerosol from flowing from the tobacco rod 31 into the aerosol generating device (1 of FIGS. 1 through 3), during smoking.

The filter rod 32 may include a first segment 321 and a second segment 322. Here, the first segment 321 may correspond to the first segment of the filter rod 22 of FIG. 4, and the second segment 322 may correspond to the second segment of the filter rod 22 of FIG. 4.

A diameter and a total length of the aerosol generating article 3 may correspond to a diameter and a total length of the aerosol generating article 2 of FIG. 4. For example, the length of The front-end plug 33 is about 7 mm, the length of the tobacco rod 31 is about 15 mm, the length of the first segment 321 is about 12 mm, and the length of the second segment 322 is about 14 mm, but it is not limited thereto.

The aerosol generating article 3 may be packaged using at least one wrapper 35. The wrapper 35 may have at least one hole through which external air may be introduced or internal air may be discharged. For example, the front end plug 33 may be packaged by a first wrapper 351, the tobacco rod 31 may be packaged by a second wrapper 352, the first segment 321 may be packaged by a third wrapper 353, and the second segment 322 may be packaged by a fourth wrapper 354. Further, the entire aerosol generating article 3 may be repackaged by a fifth wrapper 355.

In addition, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 illustrated in FIGS. 2 and 3 to the inside of the tobacco rod 31.

In addition, at least one capsule 34 may be included in the second segment 322. Here, the capsule 34 may generate a flavor or an aerosol. For example, the capsule 34 may have a configuration in which a liquid containing a flavoring material is wrapped with a film. For example, the capsule 34 may have a spherical or cylindrical shape, but is not limited thereto.

Figure 6A:
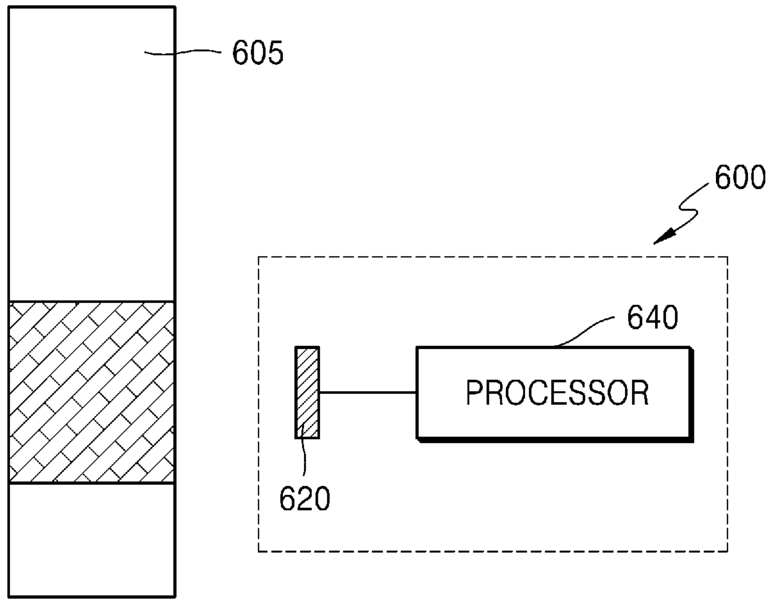
FIG. 6A is a view schematically illustrating the relationship between an electrode and an aerosol generating article according to an embodiment.

FIG. 6A is a view schematically illustrating the relationship between an electrode and an aerosol generating article according to an embodiment.

Referring to FIG. 6A, an aerosol generating device 600 may include an electrode 620 and a processor 640. In an embodiment, the processor 640 may perform a function of detecting whether an aerosol generating article 605 is inserted into or removed from the aerosol generating device 600 based on a charging time or a discharging time of the electrode 620, a function of detecting the user's puff operation, and a function of controlling power to be supplied to a heater according to a generation amount of aerosol. For example, the processor 640 may apply a specific voltage to the electrode 620 and measure a charging time of the electrode 620. The processor 640 may perform various functions based on the measured charging time of the electrode 620 or a change in the measured charging time of the electrode 620. In another example, the processor 640 may measure a discharging time of the electrode 620 as the electrode 620 is naturally discharged. That is, when a charging voltage of the electrode 620 is the same as an applied voltage, the processor 640 may measure the discharging time of the electrode 620 and may perform various functions based on the measured discharging time of the electrode 620 or a change in the discharging time.

In an embodiment, when an aerosol generating article 605 is inserted into a portion (e.g., an accommodation portion) of the aerosol generating device 600, the electrode 620 may be apart from the inserted aerosol generating article 605 by a certain distance. For example, the certain distance may refer to a distance at which a change in a charging time or a discharging time of the electrode 620 that occurs due to the aerosol generating article 605 may be detected. In an embodiment, the electrode 620 may be located to correspond to at least a part of the inserted aerosol generating article 605. For example, the electrode 620 may be located to correspond at least partially to a region in which an aerosol generating material of the aerosol generating article 605 is disposed.

Figure 6B:
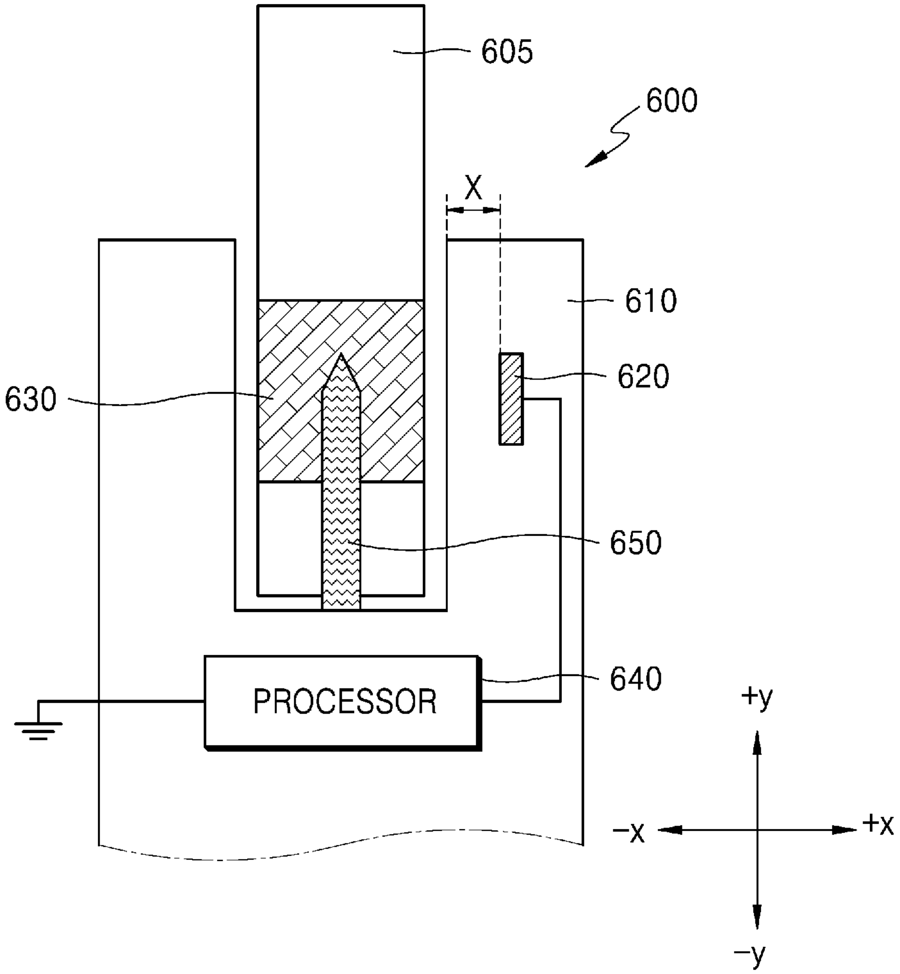
FIG. 6B is a view illustrating an example of the position of an electrode of an aerosol generating device according to an embodiment.

FIG. 6B is a view illustrating an example of the position of an electrode of an aerosol generating device according to an embodiment.

Referring to FIG. 6B, the aerosol generating device 600 may include a housing 610, an electrode 620, and a heater 650. In an embodiment, the aerosol generating device 600 may include an accommodation portion into which the aerosol generating article 605 may be inserted. For example, the housing 610 may have a shape of a cylinder including an outer circumferential surface and an inner circumferential surface. In this case, the accommodation portion may refer to a space surrounded by the inner circumferential surface of the housing 610 or a region corresponding to the inner circumferential surface of the housing 610. However, the shape of the housing 610 is not limited thereto and may be variously modified according to the design of a manufacturer.

In an embodiment, the electrode 620 may be apart from the inner circumferential surface of the housing 610 in a direction of the outer circumferential surface of the housing 610. For example, the housing 610 may extend in a first direction (e.g., +y-direction), and the electrode 620 may be apart from the inner circumferential surface of the housing 610 in a direction (e.g., +x-direction) perpendicular to the first direction. Also, as the electrode 620 is apart from the inner circumferential surface of the housing 610 by a certain distance x, the electrode 620 may be buried between the inner circumferential surface and the outer circumferential surface of the housing 610.

As the electrode 620 is disposed inside the housing 610, noise in the result of measuring data through the electrode 620 by the processor may be reduced. If the electrode 620 is disposed to be exposed to the outside and is in contact with the aerosol generating article 605, the electrode 620 may be affected in data measurement due to an external material (e.g., a tobacco leaf, dust etc.). On the contrary, the electrode 620 according to the present disclosure may be buried in the housing 610 or may not be exposed to the outside by an additional protective layer so that contamination due to the external material does not occur and thus noise in data measurement may be reduced.

In an embodiment, the electrode 620 may be disposed to correspond to, at least partially, a region in which the aerosol generating material 630 is disposed. For example, the position of the electrode 620 may correspond to a region in which the aerosol generating material 630 is disposed when the aerosol generating article 605 is fully inserted into the accommodation portion of the aerosol generating device 600.

In an embodiment, the heater 650 may correspond to an internal heating type heater. However, the type of the heater 650 is not limited thereto. The shape of the heater according to various embodiments of the present disclosure will be described below with reference to FIGS. 11A through 13B.

Figure 7A:
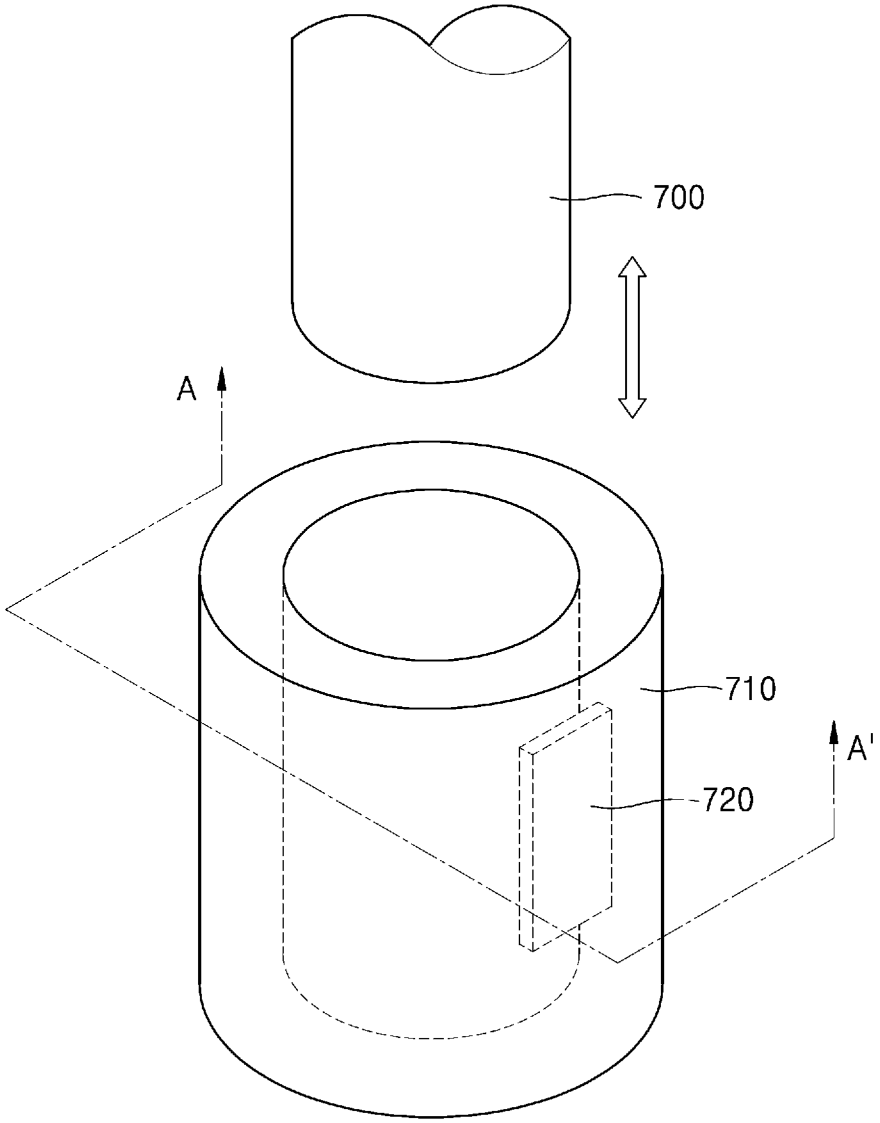
FIG. 7A is a perspective view of a housing of an aerosol generating device according to an embodiment.
Figure 7B:
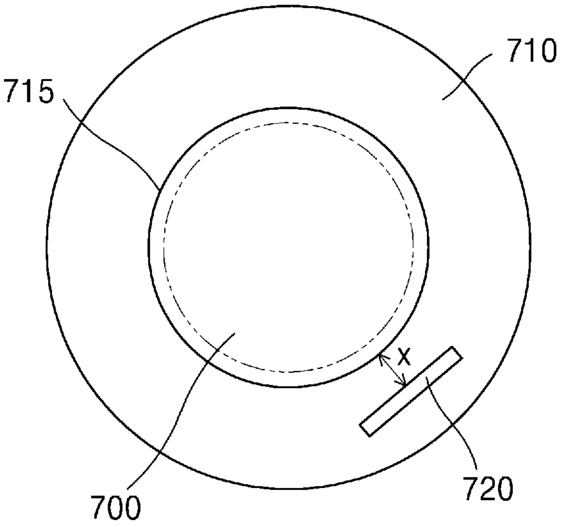
FIG. 7B is a cross-sectional view of the housing of the aerosol generating device according to an embodiment taken along line A-A'.

FIG. 7A is a perspective view of a housing of an aerosol generating device according to an embodiment. FIG. 7B is a cross-sectional view of a housing of an aerosol generating device according to an embodiment taken along line A-A'. FIGS. 7A and 7B may correspond to a specific example of the electrode 620 included in the aerosol generating device 600 of FIG. 6.

In an embodiment, the electrode 720 may have a shape of a plate with no curvature. In an embodiment, the electrode 720 may be apart from the accommodation portion 715 by a certain distance. In this case, because the electrode 720 has a shape of a plate with no curvature, the central portion of the electrode 720 may be apart from the accommodation portion 715 by x, and an end portion of the electrode 720 may be apart from the accommodation portion 715 farther than x. In order to minimize a difference between a distance between the accommodation portion 715 and the central portion of the electrode 720 and a distance between the accommodation portion 715 and the end portion of the electrode 720, a width of the electrode 720 may be substantially small.

Figure 8A:
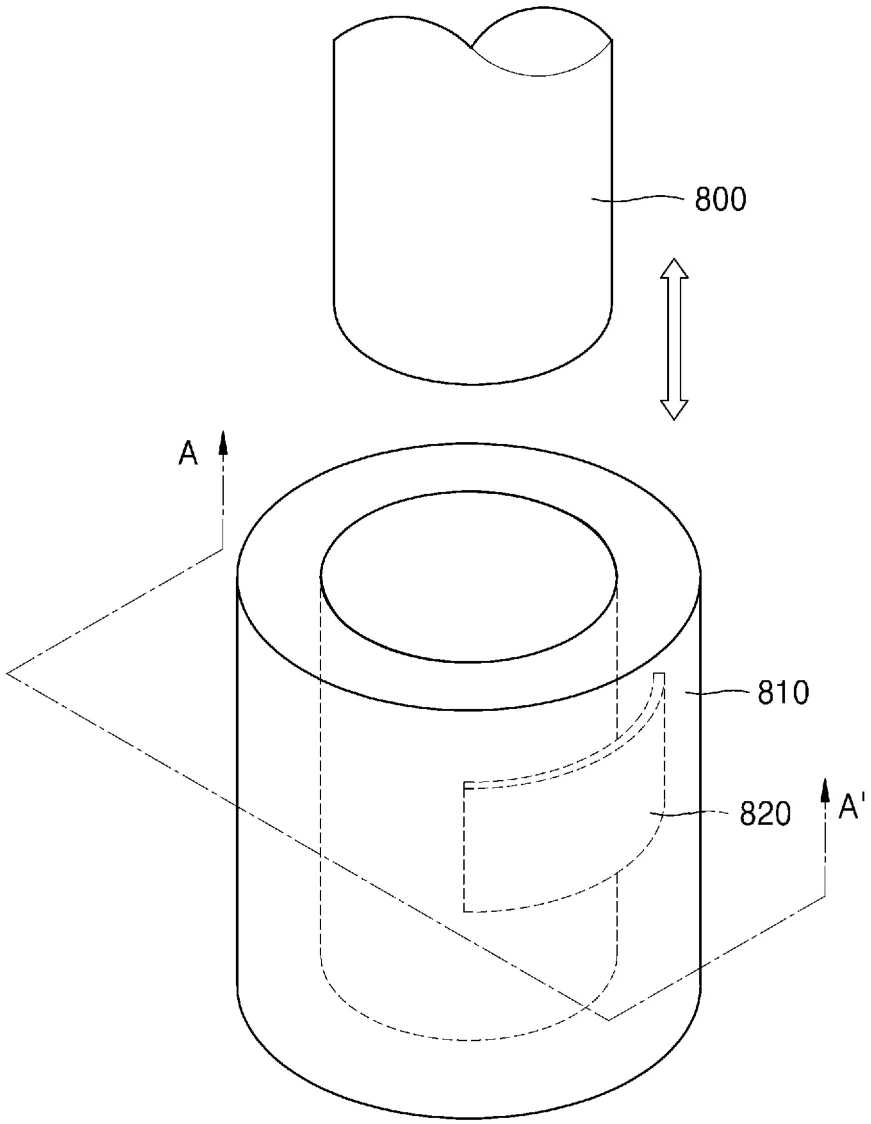
FIG. 8A is a perspective view of a housing of an aerosol generating device according to another embodiment.
Figure 8B:
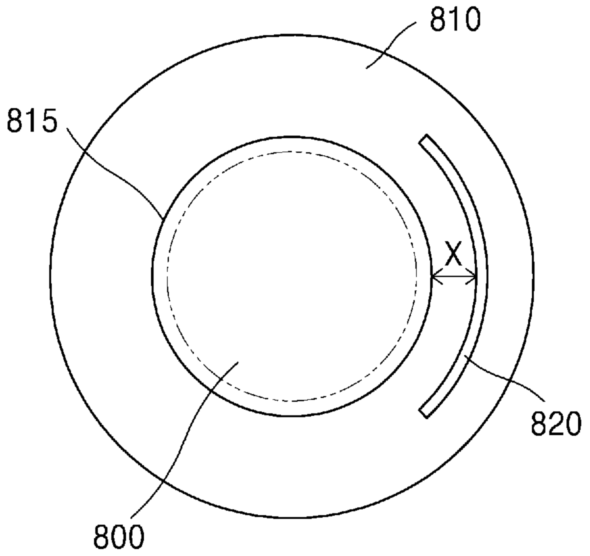
FIG. 8B is a cross-sectional view of a housing of an aerosol generating device according to another embodiment taken along line A-A'.
Figure 9A:
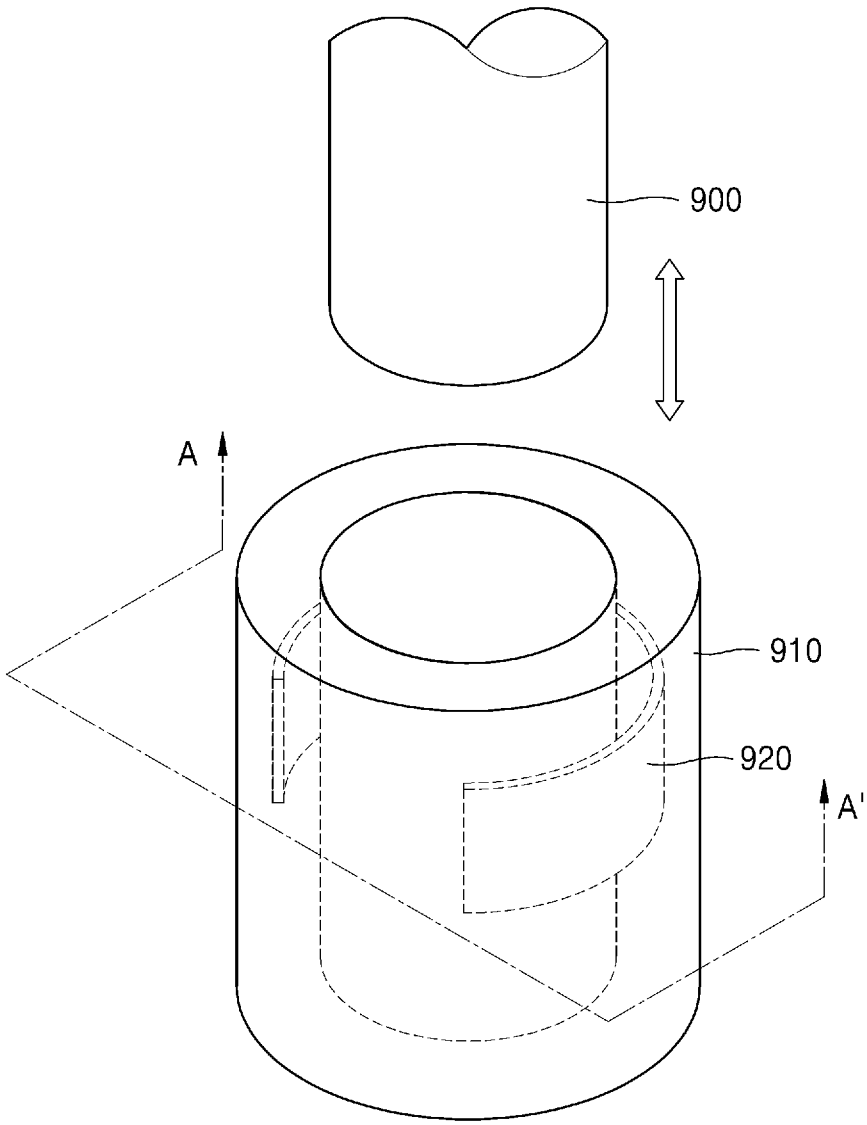
FIG. 9A is a perspective view of a housing of an aerosol generating device according to another embodiment.
Figure 9B:
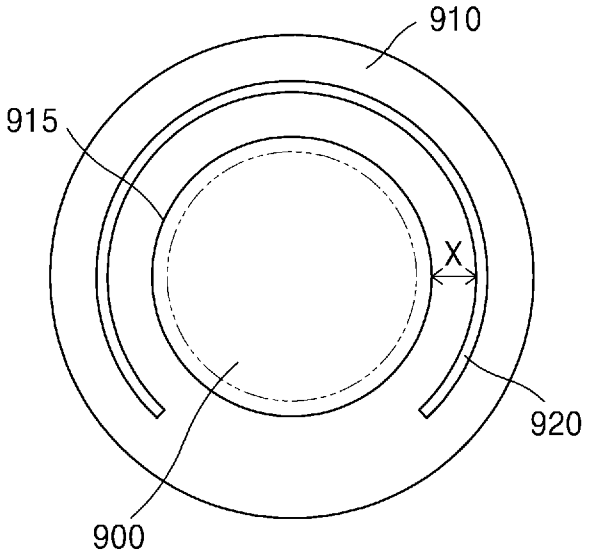
FIG. 9B is a cross-sectional view of a housing of an aerosol generating device according to another embodiment taken along line A-A'.

FIG. 8A is a perspective view of a housing of an aerosol generating device according to another embodiment. FIG. 8B is a cross-sectional view of a housing of an aerosol generating device according to another embodiment taken along line A-A'. FIG. 9A is a perspective view of a housing of an aerosol generating device according to another embodiment. FIG. 9B is a cross-sectional view of a housing of an aerosol generating device according to another embodiment taken along line A-A'. FIGS. 8A, 8B, 9A, and 9B may correspond to a specific example of the electrode 620 included in the aerosol generating device 600 of FIG. 6.

In an embodiment, the electrodes 820 and 920 may have a shape of a plate with a specific curvature. For example, the electrodes 820 and 920 may have curvatures that are less than those of inner circumferential surfaces of housings 810 and 910 and greater than those of outer circumferential surfaces of the housings 810 and 910. When the electrodes 820 and 920 have shapes of plates with curvatures, all portions (e.g., a central portion, an end portion, etc.) of the electrodes 920 and 920 may be apart from accommodation portions 815 and 915 by a certain distance.

In an embodiment, the electrodes 820 and 920 may be disposed to be apart from the accommodation portions 815 and 915 by a certain distance x and to surround at least a portion of the accommodation portions 815 and 915. For example, the electrode 820 may be disposed to surround only a region corresponding to a portion (e.g., 25%) of a circumference of the accommodation portion 815. In another example, the electrode 920 may be disposed to surround a region corresponding to a portion (e.g., 90%) of a circumference of the accommodation portion 915. However, a region surrounded by the electrode 620 is not limited thereto.

Figure 10:
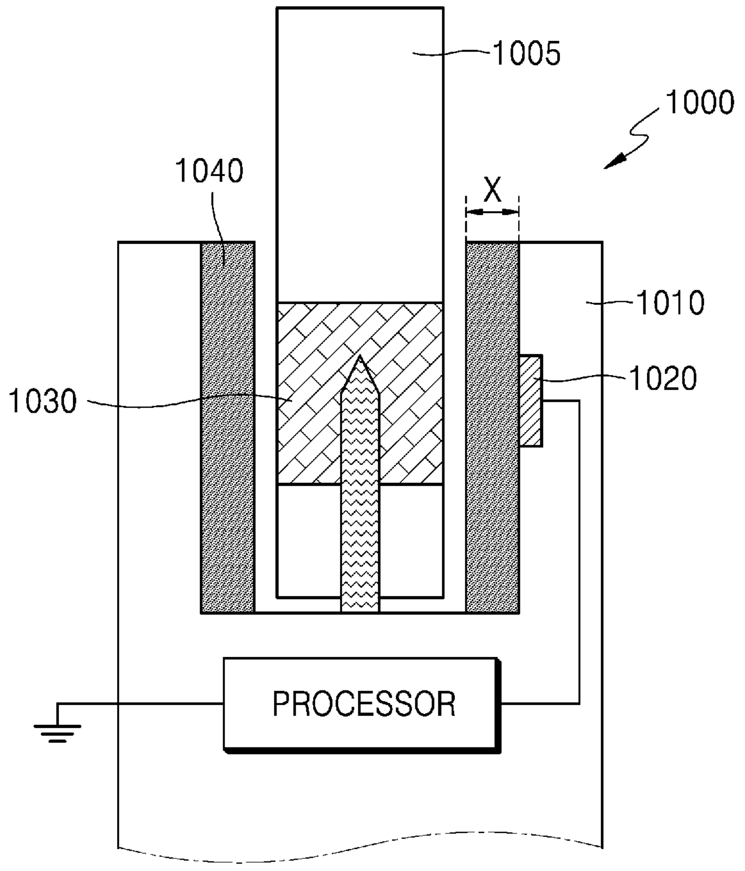
FIG. 10 is a view illustrating an example of the position of an electrode of an aerosol generating device according to another embodiment.

FIG. 10 is a view illustrating an example of the position of an electrode of an aerosol generating device according to another embodiment.

Referring to FIG. 10, an aerosol generating device 1000 may include a housing 1010 and an electrode 1020. In an embodiment, the aerosol generating device 1000 may include an accommodation portion into which an aerosol generating article 1005 may be inserted. For example, the housing 1010 may have a shape of a cylinder including an outer circumferential surface and an inner circumferential surface. However, the shape of the housing 1010 is not limited thereto and may be variously modified according to the design of a manufacturer.

In an embodiment, the electrode 1020 may be in contact with a region of the inner circumferential surface of the housing 1010. In this case, an additional protective layer 1040 may be arranged on the inner circumferential surface of the housing 1010. The protective layer 1040 may be formed to have a certain thickness x, and the electrode 1020 may be apart from the inner circumferential surface of the protective layer 1040 by a certain distance x.

The protective layer 1040 may be formed of a different material, color or pattern from that of the housing 1010. For example, the protective layer 1040 may refer to a plating layer, an oxide layer or the like that is formed not to react with the aerosol generating article 1005 or the aerosol generated by the aerosol generating article 1005.

In an embodiment, the electrode 1020 may be disposed to correspond to, at least partially, a region in which the aerosol generating material 1030 is disposed. For example, the position of the electrode 1020 may correspond to a region in which the aerosol generating material 1030 is disposed as the aerosol generating article 1005 is fully inserted into the accommodation portion of the aerosol generating device 1000.

Figure 11A:
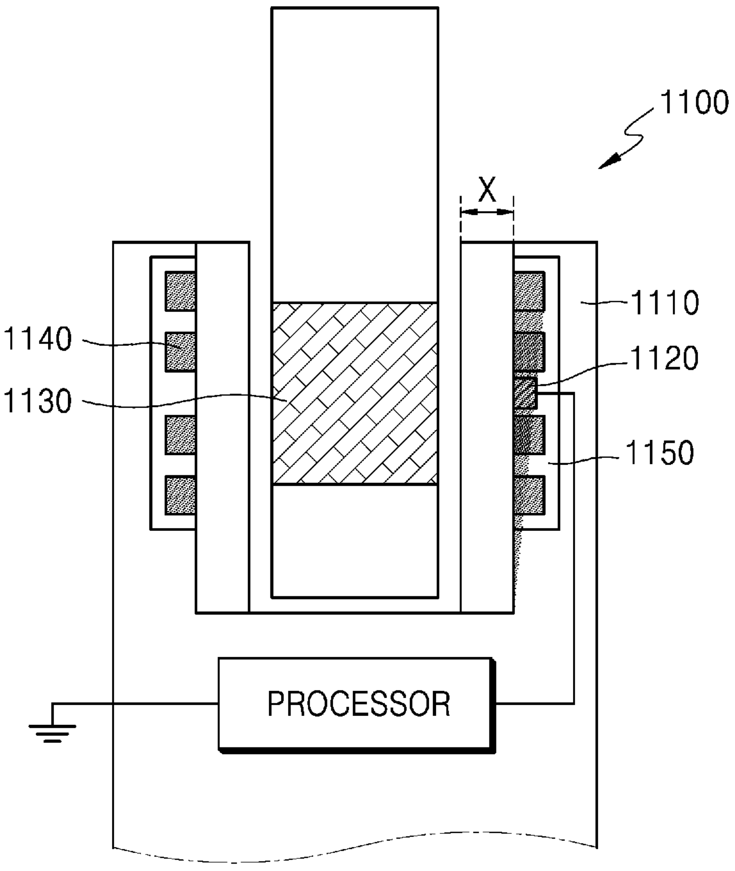
FIG. 11A is a view illustrating an example of the position of an electrode of an aerosol generating device according to another embodiment.
Figure 11B:
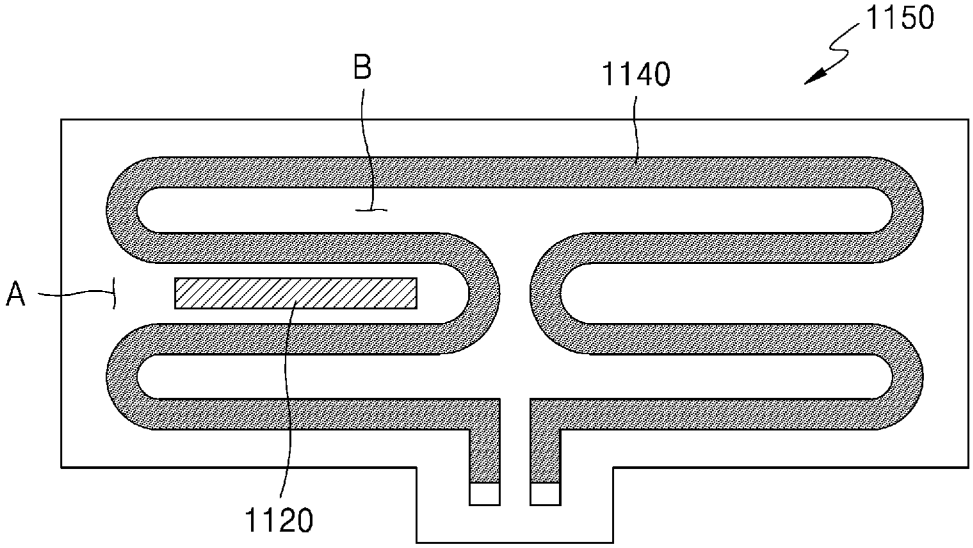
FIG. 11B is a view illustrating an example of the position of an electrode to a heater according to another embodiment.

FIG. 11A is a view illustrating an example of the position of an electrode of an aerosol generating device according to another embodiment. FIG. 11B is a view illustrating an example of the position of an electrode to a heater according to another embodiment. FIGS. 11A and 11B may correspond to a specific example of a heater 650 included in the aerosol generating device 600 of FIG. 6.

Referring to FIGS. 11A and 11B, an aerosol generating device 1100 may include a housing 1110, an electrode 1120, and a heater 1150. In an embodiment, a heater 1150 may correspond to a film heater including patterns arranged at regular intervals. For example, the heater 1150 may include a heating pattern 1140 and an electrode 1120. The heating pattern 1140 may be printed on the heater 1150 having a shape of a film (e.g., a polyimide film). The electrode 1120 may be attached to at least a portion of the heater 1150.

In an embodiment, the electrode 1120 may be arranged such that the electrode 1120 does not overlap with the heating pattern 1140 of the heater 1150. For example, the electrode 1120 may be arranged in at least one of the region A (e.g., an outer portion of the heating pattern) and the region B (an inner portion of the heating pattern).

Figure 12A:
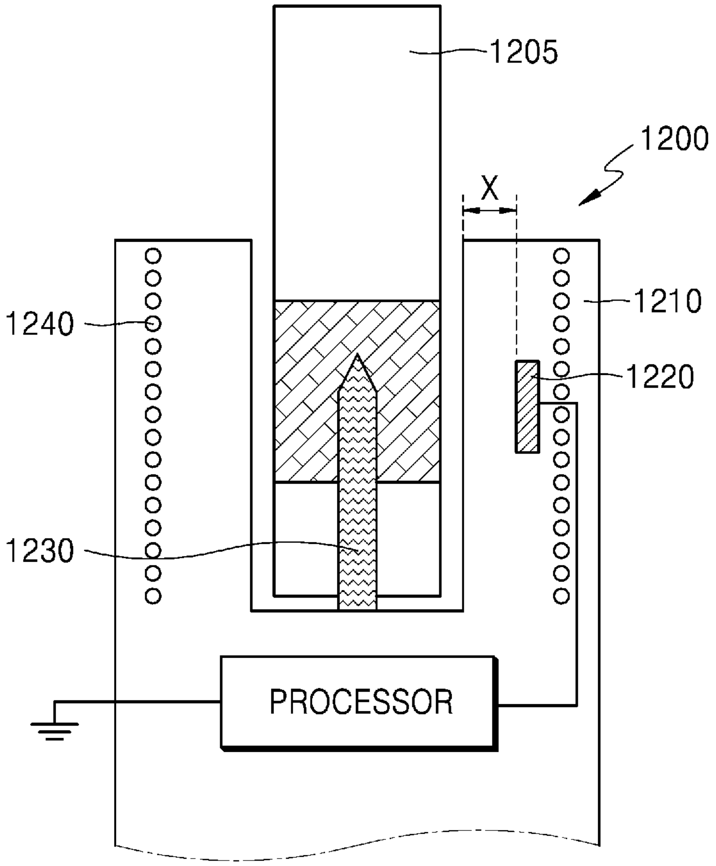
FIG. 12A is a view illustrating an example of the position of an electrode of an aerosol generating device according to another embodiment.
Figure 12B:
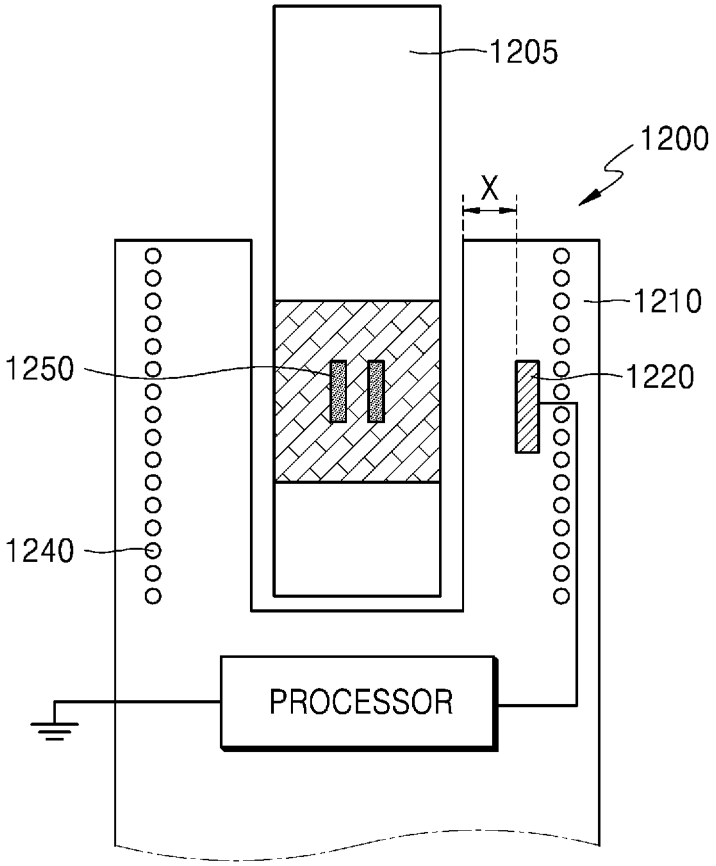
FIG. 12B is a view illustrating an example of the position of an electrode of an aerosol generating device according to another embodiment.

FIG. 12A is a view illustrating an example of the position of an electrode of an aerosol generating device according to another embodiment. FIG. 12B is a view illustrating an example of the position of an electrode of an aerosol generating device according to another embodiment. FIGS. 12A and 12B may correspond to a specific example of the heater 650 included in the aerosol generating device 600 of FIG. 6.

Referring to FIGS. 12A and 12B, an aerosol generating device 1200 may include a housing 1210, an electrode 1220, and a heater.

In an embodiment, a heater may include an internal heating type heater 1230 and an induction coil 1240. For example, the induction coil 1240 may induce a variable magnetic field to heat the internal heating type heater 1230 of the aerosol generating device 1200. In this case, the internal heating type heater 1230 may correspond to an example of a susceptor.

In another embodiment, the heater may also include only the induction coil 1240. For example, the induction coil 1240 may induce the variable magnetic field to heat a susceptor 1250 included in a medium region of an aerosol generating article 1205.

In an embodiment, the electrode 1220 may be arranged between the inner circumferential surface of the housing 1210 and the induction coil 1240. In an embodiment, the electrode 1220 may be formed not to affect the variable magnetic field generated from the induction coil 1240. For example, in order to prevent the intensity of the variable magnetic field generated by the induction coil 1240 from being reduced, the width of the electrode 1220 may be substantially small.

Figure 13A:
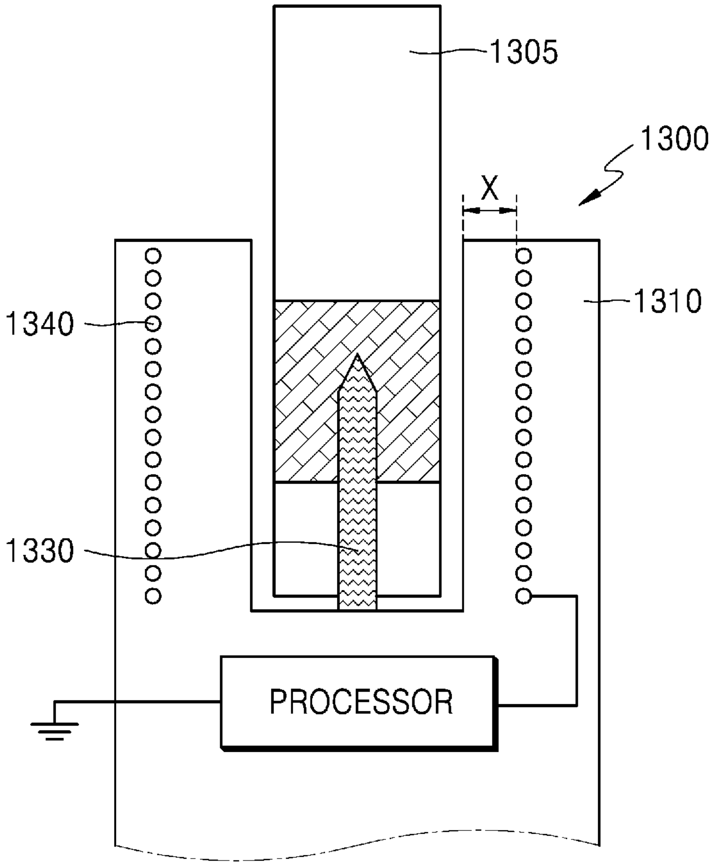
FIG. 13A is a view illustrating an example of the position of an electrode of an aerosol generating device according to another embodiment.
Figure 13B:
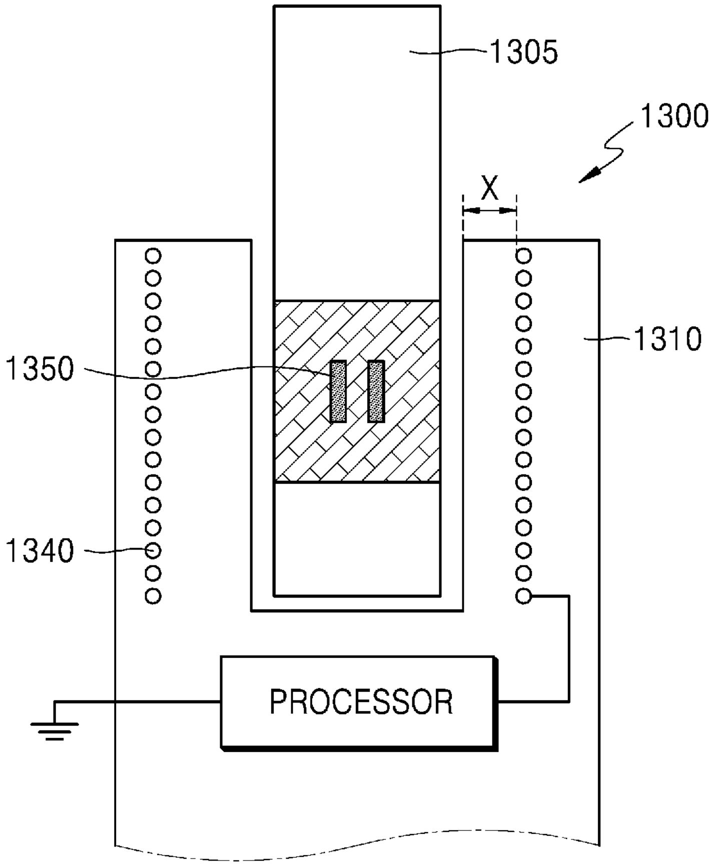
FIG. 13B is a view illustrating an example of the position of an electrode of an aerosol generating device according to another embodiment.

FIG. 13A is a view illustrating an example of the position of an electrode of an aerosol generating device according to another embodiment. FIG. 13B is a view illustrating an example of the position of an electrode of an aerosol generating device according to another embodiment. FIGS. 13A and 13B may correspond to a specific example of the electrode 620 and the heater 650 included in the aerosol generating device 600 of FIG. 6.

Referring to FIGS. 13A and 13B, the aerosol generating device 1300 may include a housing 1310 and a heater.

In an embodiment, the heater may include an internal heating type heater 1330 and an induction coil 1340. For example, the induction coil 1340 may induce the variable magnetic field to heat the internal heating type heater 1330 of the aerosol generating device 1300.

In another embodiment, the heater may also include only the induction coil 1340. For example, the induction coil 1340 may induce the variable magnetic field to heat the susceptor 1350 included in the medium region of the aerosol generating article 1305.

In an embodiment, an electrode (e.g., the electrode 620 of FIG. 6) may be formed integrally with the induction coil 1340. That is, the induction coil 1340 may heat a heating object (e.g., an internal heating type heater or a susceptor) by inducing the variable magnetic field to perform a sensing function of the electrode. A detailed description of the sensing function of the electrode will be described below with reference to FIG. 15.

Figure 14:
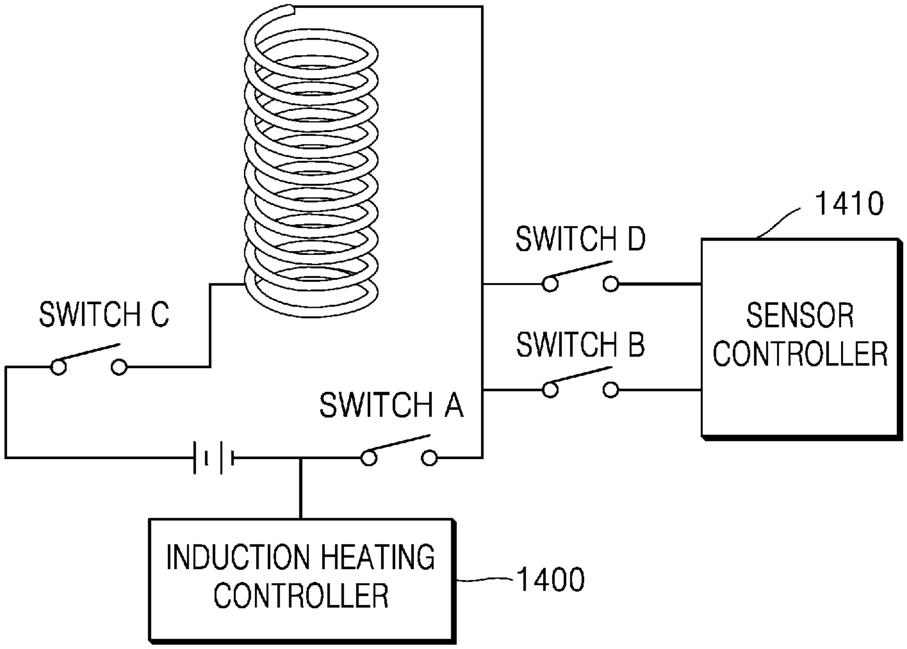
FIG. 14 is a circuit diagram of the electrode of FIGS. 13A and 13B.

FIG. 14 is a circuit diagram of the electrode of FIGS. 13A and 13B.

Referring to FIG. 14, a processor (e.g., the processor of FIGS. 13A and 13B) may include an induction heating controller 1400 and a sensor controller 1410. In an embodiment, the induction heating controller 1400 may induce the variable magnetic field through the induction coil to heat the heating object (e.g., the internal heating type heater 1330 or the susceptor 1350). In an embodiment, the sensor controller 1410 may apply power to the induction coil to detect a change in a charging time of the induction coil and to perform a sensing operation.

In an embodiment, the induction coil may be selectively controlled by the induction heating controller 1400 or the sensor controller 1410.

In an embodiment, the induction coil may perform a heating operation through the induction heating controller 1400. In this case, connection between the sensor controller 1410 and the induction coil may be broken. For example, when the induction heating controller 1400 induces the variable magnetic field through the induction coil to perform a heating operation, a switch A and a switch C may be switched into an on state, and a switch B and a switch D may be switched into an off state.

In an embodiment, power may be applied to the induction coil through the sensor controller 1410, and the induction coil may perform a sensing operation. For example, the sensing operation may include at least one of sensing whether an aerosol generating article (e.g., the aerosol generating article 605 of FIG. 6A) is inserted or removed, sensing an atomization amount generated by the aerosol generating article 605, and sensing a user's puff. In this case, connection between the induction heating controller 1400 and the induction coil may be broken. For example, when the sensor controller 1410 performs a sensing operation based on a change in a charging time of the induction coil, the switch A and the switch C may be switched into an off state, and the switch B and the switch D may be switched into an on state. In this case, when the induction coil performs the sensing operation through the sensor controller 1410, one end of a circuit may be opened to serve as a ground GND terminal. When the switch C is switched into the off state, one end of the induction coil may be opened to serve as a ground GND terminal.

FIG. 14 illustrates that the sensor controller 1410 and the induction coil are connected to each other via two lines. However, embodiments are not limited thereto. In another embodiment, the sensor controller 1410 and the induction coil may also be connected via only one line including the switch B.

Figure 15:
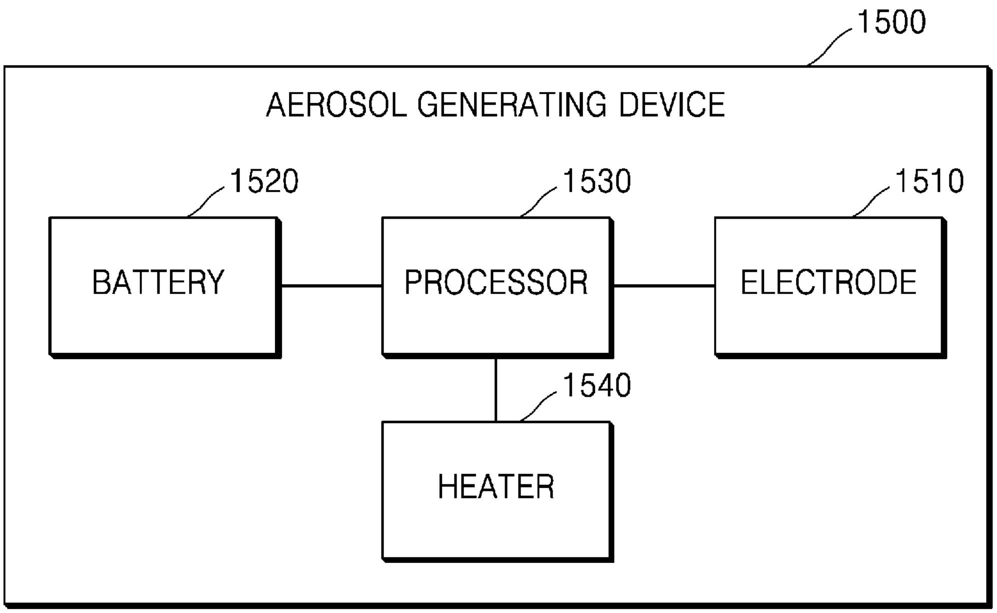
FIG. 15 is a block diagram of an aerosol generating device according to an embodiment.

FIG. 15 is a block diagram of an aerosol generating device according to an embodiment.

Referring to FIG. 15, an aerosol generating device 1500 may include an electrode 1510, a battery 1520, a processor 1530, and a heater 1540.

In the electrode 1510, when a change caused by an aerosol generating article occurs, a charge amount may be changed. For example, the change caused by the aerosol generating article may include insertion and removal of the aerosol generating article, generation of aerosol caused by the aerosol generating article, and removal of aerosol by the user's puff In an embodiment, when the aerosol generating article is inserted into the aerosol generating device 1500 and is disposed close to the electrode 1510, the charge amount of the electrode 1510 may be changed according to permittivity $\varepsilon$ of components included in the aerosol generating article. Permittivity that is a characteristic value indicating electrical characteristics of a nonconductor may refer to the degree of polarization generated with respect to an external electric field. In this case, even when the inserted aerosol generating article is removed, the charge amount of the electrode 1510 may be changed.

For example, the aerosol generating article may be a cigarette. In this case, the cigarette may include a wrapping material (e.g., an external wrapper, an internal wrapper, etc.) having a certain amount of moisture or hygroscopic moisture, and may also include a solid state smokeable material (e.g., a tobacco leaf, a granular tobacco material etc.) included in a medium portion. In this case, because the permittivity of moisture ($H_2O$) is about 80 times higher than the permittivity of air, the electrode 1510 may be affected by insertion of the cigarette even though the wrapping material and the smokeable material include a small amount of moisture.

As another example, when the aerosol generating article is a cartridge including a liquid state smokeable material, the electrode 1510 may be affected by insertion of the cartridge because the liquid has high permittivity.

In an embodiment, as the aerosol generating article is inserted into the aerosol generating device 1500, the aerosol generating article is disposed close to the electrode 1510, and thus the charge amount of the electrode 1510 may be reduced. In an embodiment, when the aerosol generating article is far away from the electrode 1510 as the aerosol generating article is removed from the aerosol generating device 1500, the charge amount of the electrode 1510 may be increased.

In an embodiment, the processor 1530 may determine whether the aerosol generating article is inserted or removed by using the permittivity of components included in the aerosol generating article. Thus, the material of the aerosol generating article may be variously changed. In an aerosol generating device according to the related art, the insertion of the aerosol generating article has been determined through a wrapping paper of the aerosol generating article or an aluminum thin paper included in the wrapping paper. However, the aerosol generating device according to the present invention may detect insertion or removal of the aerosol generating article even when the aluminum thin paper is not included in the aerosol generating article. Therefore, the material of the wrapping paper may be variously changed.

In an embodiment, an aerosol is generated as the aerosol generating article is heated, the charge amount of the electrode 1510 may be changed according to the permittivity of aerosol.

For example, when the aerosol generating article is heated by the heater 1540, the aerosol having uniform moisture may be generated. In this case, because the permittivity of aerosol is about 80 times higher than the permittivity of air, the electrode 1510 may be affected by the aerosol.

In an embodiment, when the aerosol is generated as the aerosol generating article is heated, the charge amount of the electrode 1510 may be reduced. In an embodiment, when the aerosol generated as the aerosol generating article is heated is removed by the user's puff, the charge amount of the electrode 1510 may be increased.

In an embodiment, a processor 1530 may determine the generation amount of aerosol and the user's puff by using the permittivity of aerosol generated as the aerosol generating article is heated. Thus, the aerosol generating device 1500 may provide a uniform atomization amount and may detect the user's puff without an additional sensor module (e.g., a puff detection sensor).

The battery 1520 may supply power required for operating the aerosol generating device 1500. For example, the battery 1520 may supply power so that the processor 1530 may detect a change in the charge amount in the electrode 1510. Also, the battery 1520 may supply power required for operations of other hardware components, for example, various sensors (not shown), a user interface (not shown), and a memory (not shown), included in the aerosol generating device 1500. The battery 1520 may be a chargeable battery or disposable battery. For example, the battery 1520 may be a lithium polymer (LiPoly) battery. However, embodiments are not limited thereto.

The processor 1530 may control the overall operation of the aerosol generating device 1500. For example, the processor 1530 may control operations of other components included in the aerosol generating device 1500 in addition to the battery 1520. Also, the processor 1530 may check each of the components of the aerosol generating device 1500, thereby determining whether the aerosol generating device 1500 is in an operable state.

In an embodiment, the processor 1530 may detect a change caused by an aerosol generating article based on the voltage of the electrode 1510. For example, the processor 1530 may determine a change in the charging time of the electrode 1510 through an output voltage $V_{out}$ and an input voltage $V_{in}$ of the electrode 1510. The processor 1530 may detect a change caused by the aerosol generating article based on a change in the charging time of the electrode 1510. A method of checking the voltage of the electrode 1510 by using the processor 1530 will be described in detail below with reference to FIGS. 17A, 17B, 18A and 18B.

Figure 16A:
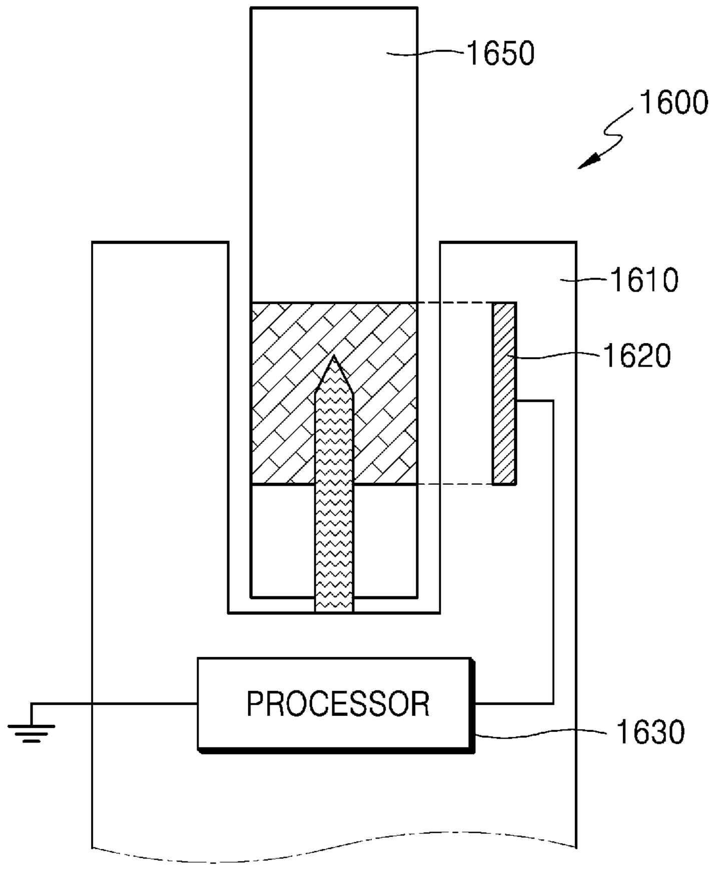
FIGS. 16A and 16B are views illustrating examples of a method for determining the type of an aerosol generating article by using an electrode of an aerosol generating device according to an embodiment.
Figure 16B:
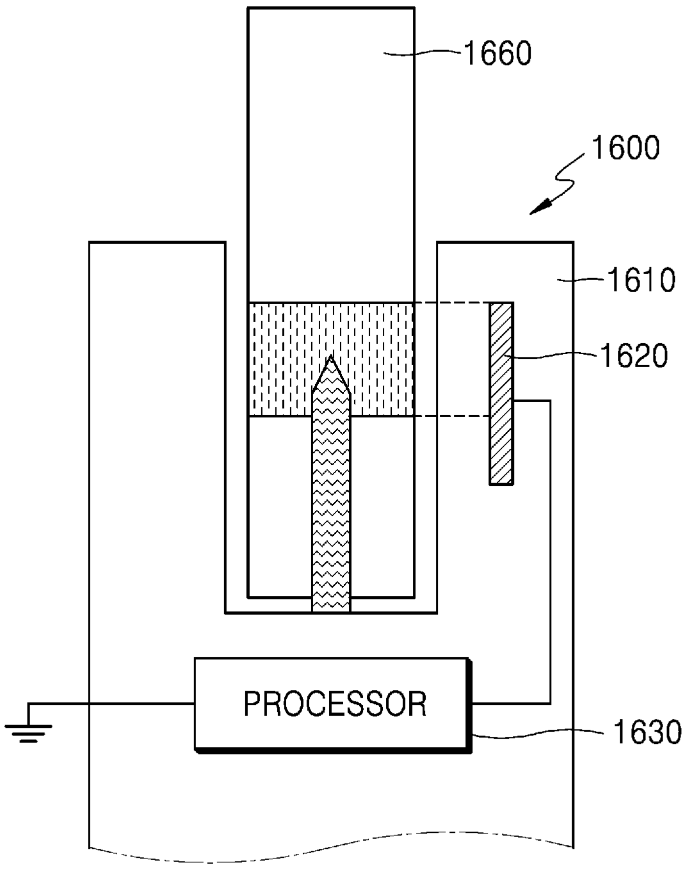

FIGS. 16A and 16B are views illustrating examples of a method for determining the type of an aerosol generating article by using an electrode of an aerosol generating device according to an embodiment. The aerosol generating device 1600 of FIGS. 16A and 16B may correspond to the aerosol generating device 1500 of FIG. 15.

Referring to FIGS. 16A and 16B, different types of aerosol generating articles may be inserted into the aerosol generating device 1600 through an inner circumferential surface of a housing 1610. For example, a first aerosol generating article 1650 may have a larger area including a tobacco material than a second aerosol generating article 1660. In this case, the tobacco material may include at least one of a solid state tobacco material and a liquid state tobacco material, and may be in the form of a granule, a capsule, or the like.

In an embodiment, when the aerosol generating article is inserted, the processor 1630 may determine the type of the aerosol generating article through the electrode 1620.

For example, the first aerosol generating article 1650 may include more moisture according to the tobacco material than the second aerosol generating article 1660. When the aerosol generating article is inserted, if the charge amount of the electrode 1620 is further reduced, the processor 1630 may determine that the first aerosol generating article 1650 is inserted. The processor 1630 may store the charge reduction amount of the electrode 1620 according to the type of the aerosol generating article in a memory (not shown).

However, this is just an example, and the second aerosol generating article 1660 may include more moisture according to the tobacco material than the first aerosol generating article 1650, depending on composition ratios of tobacco materials included in the first aerosol generating article 1650 and the second aerosol generating article 1660.

Figure 17A:
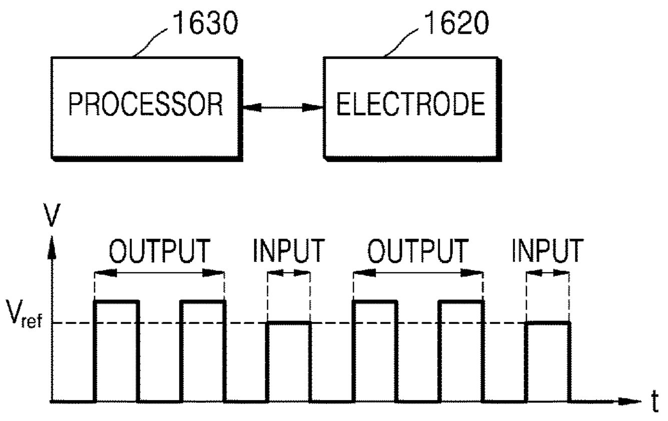
FIG. 17A is a graph for describing a method, by which a processor according to an embodiment detects a change in a charging time of an electrode.
Figure 17B:
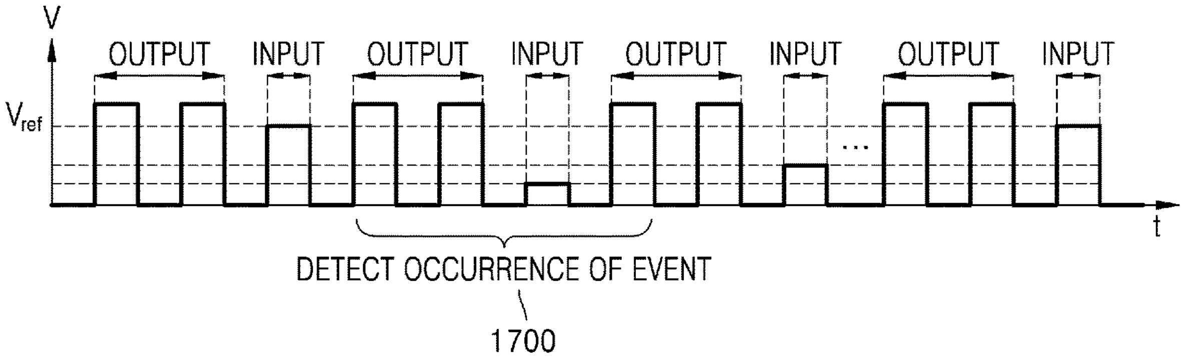
FIG. 17B is a graph for describing a method, by which a processor according to the embodiment detects a change in a charging time of an electrode.

FIG. 17A and FIG. 17B are graphs for describing a method of detecting a method, by which a processor according to an embodiment detects a change in a charging time of an electrode.

Referring to FIG. 17A, a processor (e.g., the processor 1630 of FIGS. 16A and 16B) may be connected to an electrode (e.g., the electrode 1620 of FIGS. 16A and 16B) via one line. In an embodiment, the processor 1630 may apply an output voltage to the electrode 1620 at a certain period so as to charge the electrode 1620. In this case, the output voltage may be adjusted by using a pulse width modulation (PWM) method. For example, the processor 1630 may apply the output voltage to the electrode 1620 every 50 ms so as to charge the electrode 1620.

In an embodiment, the processor 1630 may detect an input voltage input from the electrode 1620 after applying the output voltage to the electrode 1620 at a preset number of times (e.g., twice). For example, a voltage value of the output voltage may be in a range of about 2.8 V to about 3.3 V. In another example, the voltage value of the output voltage may be about 5 V. In this case, when the input voltage input from the electrode 1620 is maintained as a reference voltage $V_{ref}$, it may be determined that an event (e.g., insertion of the aerosol generating article, the user's puff, etc.) did not occur. The number of times the processor 1630 applies the output voltage may be variously modified according to a design of a manufacturer.

Referring to FIG. 17B, the processor 1630 may determine whether an event occurs by detecting a change in the input voltage input from the electrode 1620. For example, when the input voltage input from the electrode 1620 is detected to be lower than the reference voltage $V_{ref}$, the processor 1630 may detect (1700) the occurrence of the event. For example, when the input voltage input from the electrode 1620 is first detected to be lower than the reference voltage $V_{ref}$, the processor 1630 may determine that an event in which the aerosol generating article is inserted has occurred.

In an embodiment, after the input voltage dropped below the reference voltage $V_{ref}$ according to the occurrence of the event, as the processor 1630 applies an output voltage to the electrode 1620 at a certain period, the input voltage may reach the reference voltage $V_{ref}$.

Figure 18A:
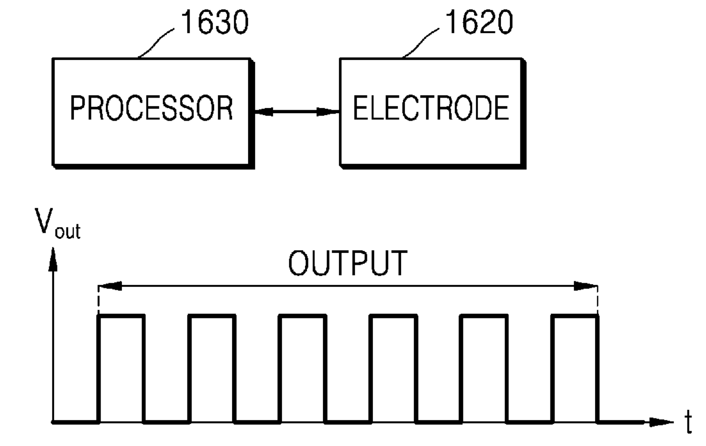
FIG. 18A is a graph for describing a method, by which a processor according to another embodiment detects a change in a charging time of an electrode.
Figure 18B:
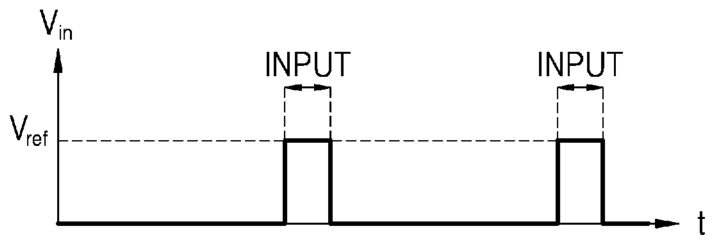
FIG. 18B is a graph for describing a method, by which a processor according to the another embodiment detects a change in a charging time of an electrode.

FIG. 18A and FIG. 18B are graphs for describing a method, by which a processor according to another embodiment detects a change in a charging time of an electrode.

Referring to FIG. 18A, the processor 1630 and the electrode 1620 may be connected to each other via at least two lines. For example, the at least two lines may include a line for applying an output voltage so that the processor 1630 charges the electrode 1620, and a line for applying an input voltage to the processor 1630 so as to transmit the charging state of the electrode 1620.

In an embodiment, the processor 1630 may apply the output voltage to the electrode 1620 at a certain period. In this case, the output voltage may be adjusted by using a PWM method. For example, the processor 1630 may apply the output voltage to the electrode 1620 every 50 ms so as to charge the electrode 1620. Referring to FIG. 18B, the processor 1630 may apply the output voltage to the electrode 1620 and simultaneously detect the input voltage input from the electrode 1620. For example, when checking the charging state of the electrode 1620, the processor 1630 may detect the input voltage without stopping output of the output voltage for charging the electrode 1620.

However, FIG. 18A and FIG. 18B are just an example, and even when the processor 1630 and the electrode 1620 are connected to each other via two or more lines, the processor 1630 may stop output of the output voltage when detecting the input voltage input from the electrode 1620.

Figure 19A:
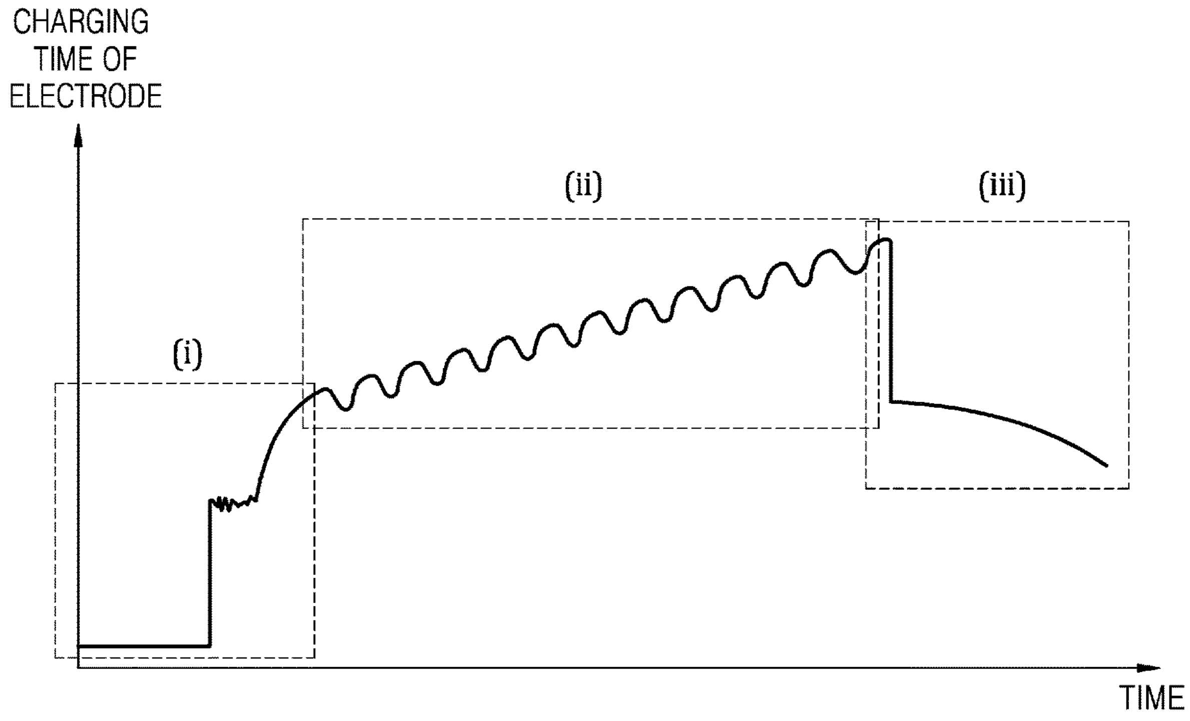
FIG. 19A is a graph for describing a charging time of an electrode of an aerosol generating device according to an embodiment.

FIG. 19A is a graph for describing a charging time of an electrode of an aerosol generating device according to an embodiment.

Referring to FIG. 19A, when an aerosol generating article (e.g., the aerosol generating article 605 of FIG. 6) is inserted into an aerosol generating device (e.g., the aerosol generating device 600 of FIG. 6) and the aerosol generating article 605 is removed after the user's puff is performed, a change in a charging time of the electrode (e.g., the electrode 620 of FIG. 6) may be classified into an (i) segment, an (ii) segment, and an (iii) segment.

In an embodiment, the processor (e.g., the processor 1530 of FIG. 15) may detect insertion of the aerosol generating article 605 based on the charging time of the electrode 620 in the (i) segment. In an embodiment, the processor 1530 may detect and count the user's puff based on the charging time of the electrode 620 in the (ii) segment and may control the heating temperature of the heater (e.g., the heater 1540 of FIG. 15). In an embodiment, the processor 1530 may detect removal of the aerosol generating article 605 based on the charging time of the electrode 620 in the (iii) segment and may control a cleaning operation of the heater 1540. A detailed operation of a processor in each segment will be described below with reference to FIGS. 20 through 33B.

Figure 19B:
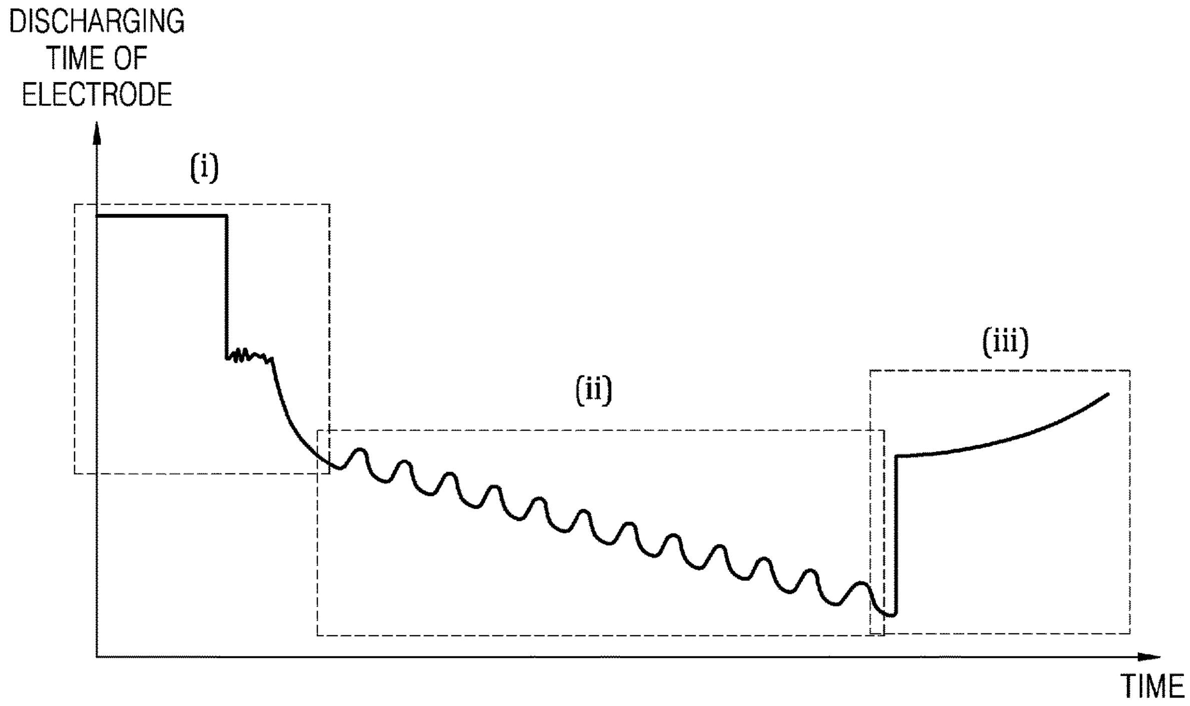
FIG. 19B is a graph for describing a discharging time of the electrode in FIG. 19A.

FIG. 19B is a graph showing a discharging time of the electrode in FIG. 19A.

Referring to FIG. 19B, when an aerosol generating article (e.g., the aerosol generating article 605 of FIG. 6) is inserted into an aerosol generating device (e.g., the aerosol generating device 600 of FIG. 6) and the aerosol generating article 605 is removed after the user's puff is performed, a change in a discharging time of the electrode (e.g., the electrode 620 of FIG. 6) may be classified into an (i) segment, an (ii) segment, and an (iii) segment.

In an embodiment, a processor (e.g., the processor 1530 of FIG. 15) may detect insertion of the aerosol generating article 605 based on the discharging time of the electrode 620 in the (i) segment. In an embodiment, the processor 1530 may detect the user's puff and count based on the discharging time of the electrode 620 in the (ii) segment and may control the heating temperature of a heater (e.g., the heater 1540 of FIG. 15). In an embodiment, the processor 1530 may detect removal of the aerosol generating article 605 based on the discharging time of the electrode 620 in the (iii) segment and may control a cleaning operation of the heater 1540.

The graph showing the discharging time of the electrode in FIG. 19B is the vertical flip of a graph showing the charging time of the electrode in FIG. 19A, but embodiments are not limited thereto.

Figure 20:
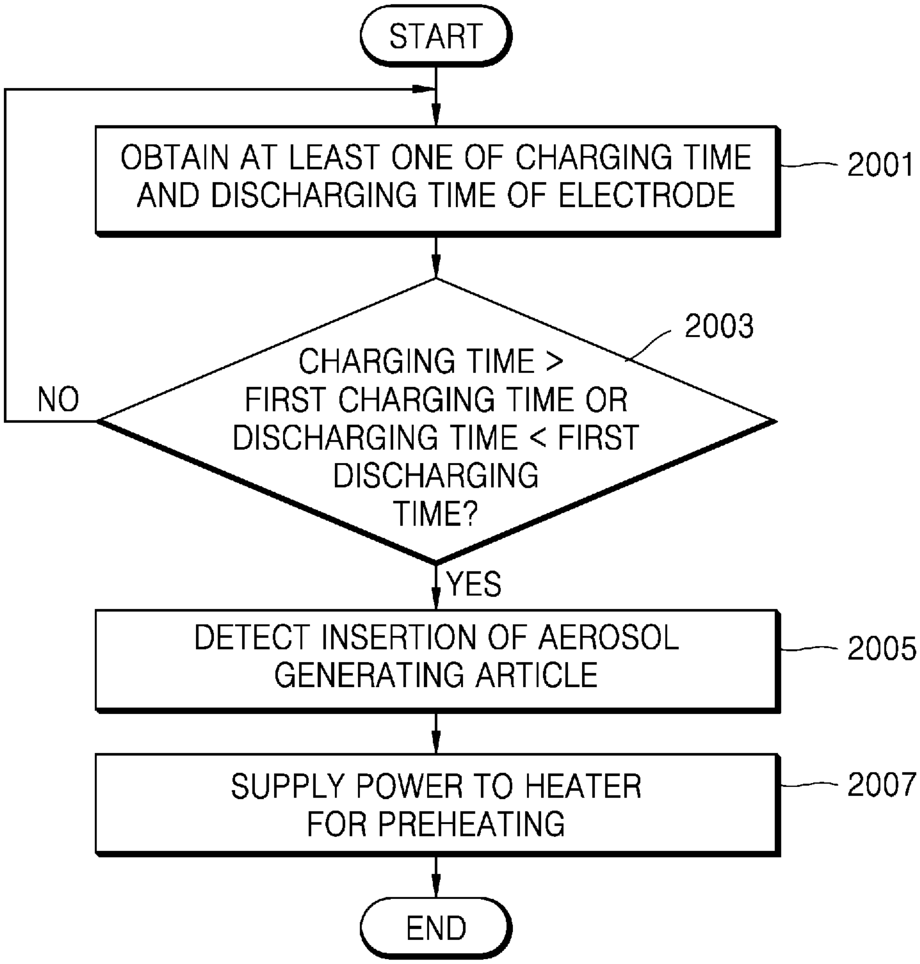
FIG. 20 is a flowchart illustrating a case where an aerosol generating device according to an embodiment detects insertion of an aerosol generating article.

FIG. 20 is a flowchart illustrating a case where an aerosol generating device according to an embodiment detects insertion of an aerosol generating article. The flowchart of FIG. 20 may correspond to an operation of a processor in the (i) segment of FIG. 19.

Referring to FIG. 20, the processor (e.g., the processor 1530 of FIG. 15) may obtain at least one of a charging time and a discharging time of the electrode (e.g., the electrode 1510 of FIG. 15) in operation 2001. In an embodiment, the processor 1530 may obtain the charging time of the electrode 1510 based on an input voltage (e.g., the input voltage in FIGS. 17A, 17B, 18A and 18B) input from the electrode 1510. For example, the charging time of the electrode 1510 may refer to a time taken for the charging voltage of the electrode 1510 to reach a preset reference voltage (e.g., the reference voltage $V_{ref}$ in FIGS. 17A, 17B, 18A and 18B). In another embodiment, the processor 1530 may obtain the discharging time of the electrode 1510 based on the input voltage input from the electrode 1510. For example, the discharging time of the electrode 1510 may refer to a time taken for the charging voltage of the electrode 1510 to reach 0 V.

According to an embodiment, the processor 1530 may determine whether the charging time of the electrode is longer than a designated first charging time, or the discharging time of the electrode is shorter than a designated first discharging time in operation 2003. For example, the designated first charging time and the designated first discharging time may refer to a charging time and a discharging time, respectively, which are taken for the charging voltage of the electrode 1510 to reach the preset reference voltage $V_{ref}$ after having dropped by insertion of the aerosol generating article.

According to an embodiment, if the charging time of the electrode is longer than the designated first charging time or the discharging time of the electrode is shorter than the designated first discharging time, the processor 1530 may detect insertion of the aerosol generating article in operation 2005. According to an embodiment, when the charging time of the electrode is shorter than the designated first charging time or the discharging time of the electrode is longer than the designated first discharging time, the processor 1530 may go back to operation 2001.

According to an embodiment, the processor 1530 may supply power to the heater 1540 so as to preheat a heater (e.g., the heater 1540 of FIG. 15) in operation 2007. For example, when insertion of the aerosol generating article is detected, the processor 1530 may supply power to the heater 1540 so as to perform an automatic start function of the aerosol generating device (e.g., the aerosol generating device 1500 of FIG. 15). In this case, the heater 1540 may be controlled to heat in the range of about 220° C. to about 230° C., about 290° C. to about 300° C., or about 330° C. to about 340° C. However, the range of a preheating temperature is illustrative and may be variously changed according to the design of the manufacturer.

Figure 21:
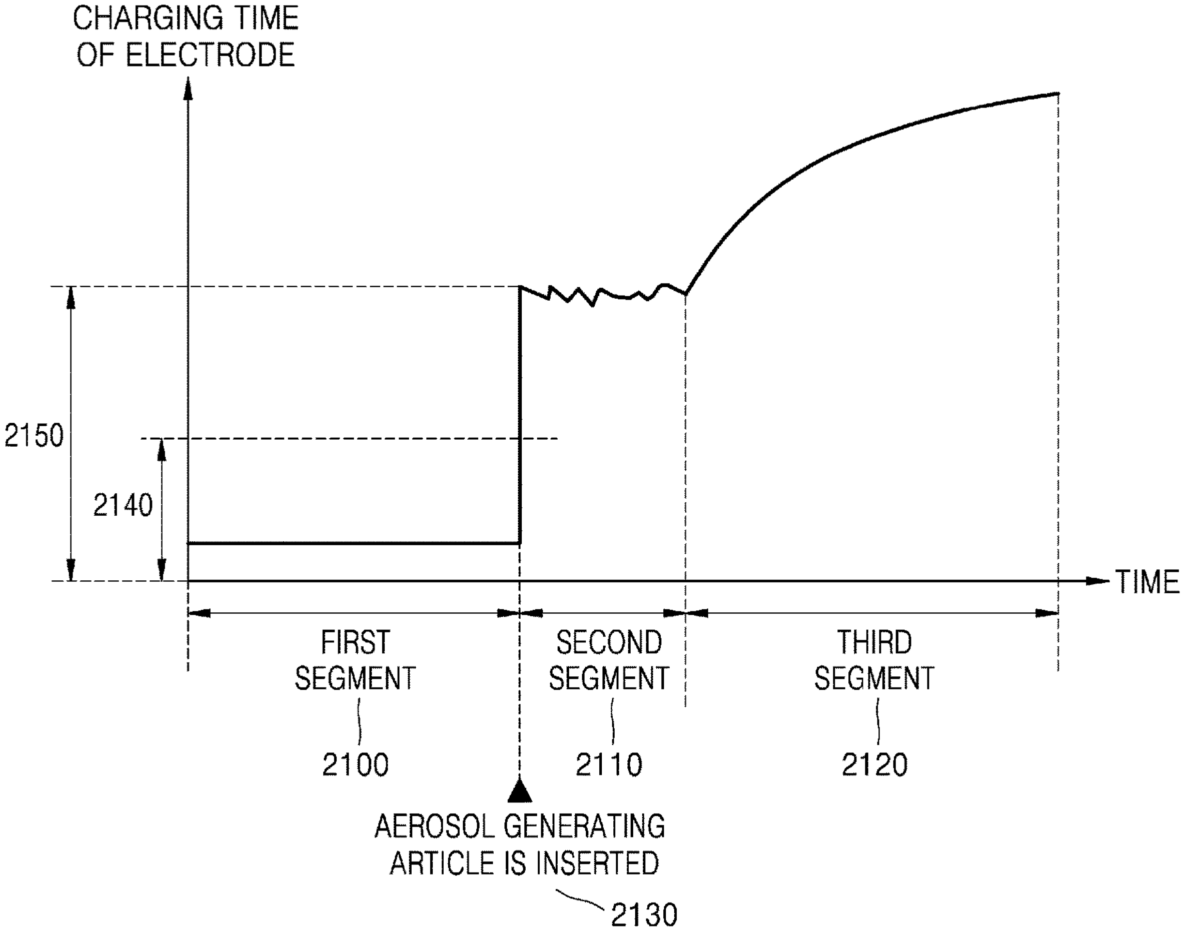
FIG. 21 is a graph showing a charging time of an electrode that varies as an aerosol generating article is inserted into an aerosol generating device according to an embodiment.

FIG. 21 is a graph showing a charging time of an electrode that varies as an aerosol generating article is inserted into an aerosol generating device according to an embodiment.

Referring to FIG. 21, a time segment in which it is determined whether an aerosol generating article is inserted into an aerosol generating device (e.g., the aerosol generating device 1500 of FIG. 15) may be classified into a first segment 2100, a second segment 2110, and a third segment 2120. The first segment 2100 may correspond to a segment in which the aerosol generating article waits before being inserted into the aerosol generating device. The second segment 2110 may correspond to a segment in which the aerosol generating article is prepared to be preheated immediately after the aerosol generating article is inserted into the aerosol generating device. The third segment 2120 may correspond to a segment in which the aerosol generating article is preheated.

According to an embodiment, a charging time required to charge an electrode (e.g., the electrode 1510 of FIG. 15) in the first segment 2100 may be substantially uniform. Even when the electrode 1510 does not include an additional discharging circuit, the electrode 1510 may be continuously discharged. Thus, the electrode 1510 may require a uniform charging time to make up for the charge amount lost as the electrode 1510 is continuously discharged. Thus, the processor (e.g., the processor 1530 of FIG. 15) of the aerosol generating device may apply a uniform voltage to the electrode 1510 continuously.

In an embodiment, the charging time of the electrode may be increased at a time point 2130 at which the aerosol generating article is inserted into the aerosol generating device. In this case, the charging time of the electrode may be rapidly increased. In an embodiment, when a charging time 2150 of the electrode 1610 is longer than the designated first charging time 2140, the processor 1530 may determine that the aerosol generating article is inserted, and may control the heater (e.g., the heater 1540 of FIG. 15) to be preheated.

According to an embodiment, while it is prepared to preheat the aerosol generating article in the second segment 2110, the charging time of the electrode 1510 may be changed only within a certain range. According to an embodiment, while the aerosol generating article is preheated in the third segment 2120, the charging time of the electrode 1510 may be gradually increased.

Figure 22A:
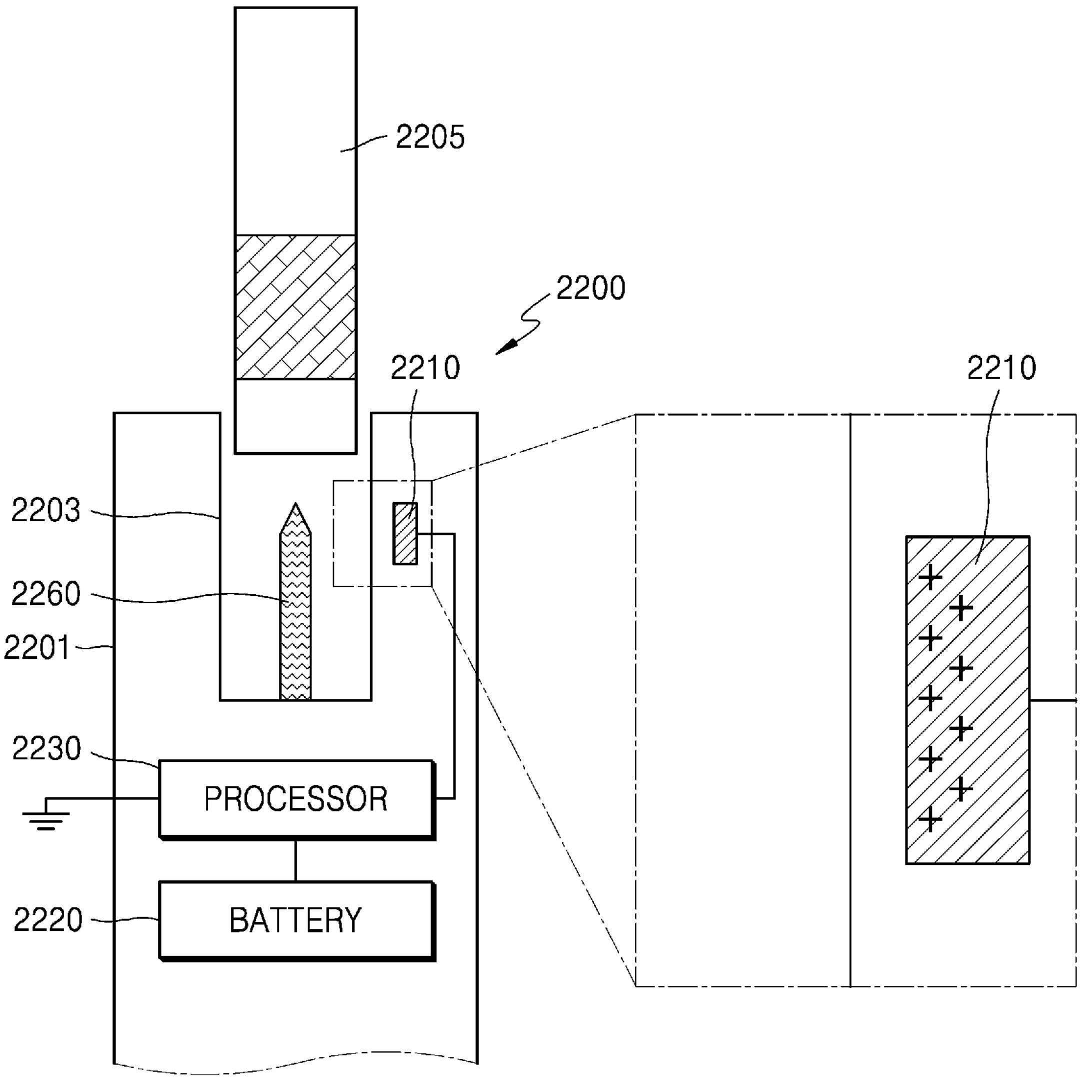
FIG. 22A illustrates a state before an aerosol generating article is inserted into an aerosol generating device according to an embodiment.
Figure 22B:
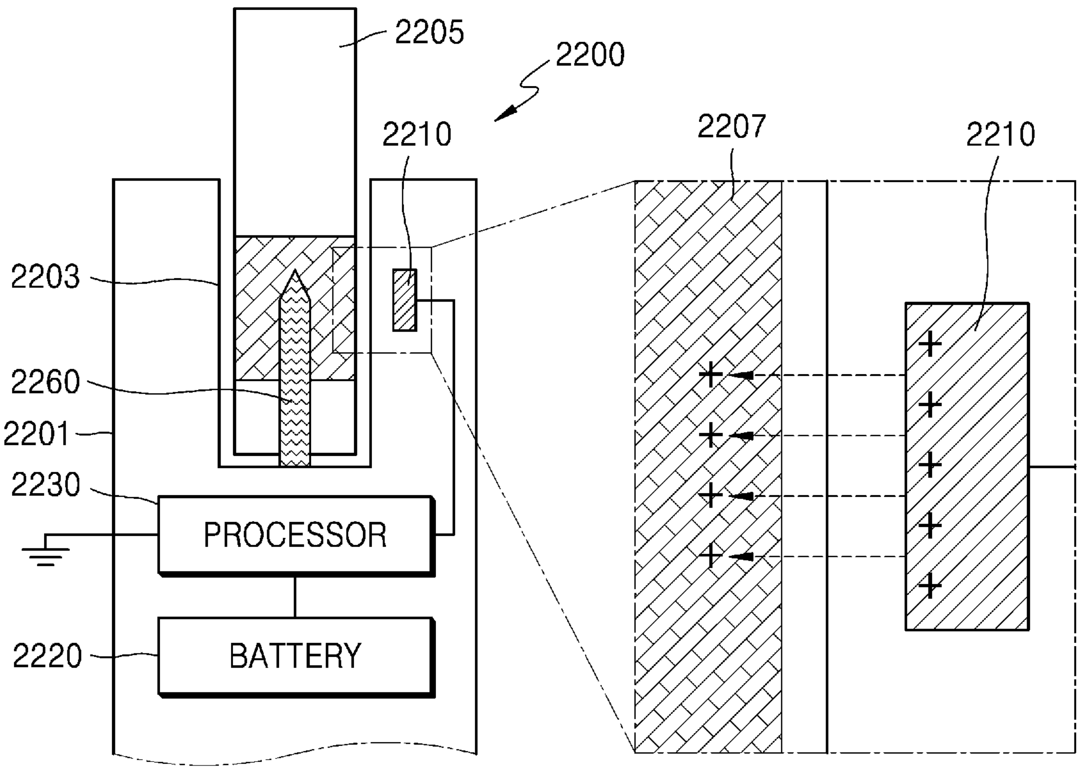
FIG. 22B illustrates a state after an aerosol generating article is inserted into an aerosol generating device according to an embodiment.

FIG. 22A illustrates a state before an aerosol generating article is inserted into an aerosol generating device according to an embodiment. FIG. 22B illustrates a state after an aerosol generating article is inserted into an aerosol generating device according to an embodiment.

Referring to FIGS. 22A and 22B, an aerosol generating device 2200 may include a housing 2201, an electrode 2210, a battery 2220, a processor 2230, and a heater 2260.

The electrode 2210 of FIG. 22A may include positive (+) charges of a first charge amount. Thereafter, when the aerosol generating article 2205 is inserted into an accommodation portion 2203 corresponding to an inner circumferential surface of the housing 2201, the electrode 2210 of FIG. 22B may lose some of the positive (+) charges taken by moisture of components (e.g., a tobacco material 2207, an external wrapper, etc.) included in the aerosol generating article 2205. Thus, the electrode 2210 of FIG. 22B may include positive (+) charges of a second charge amount that is less than the first charge amount.

As shown in FIG. 22B, when the positive (+) charges of the electrode 2210 are decreased from the first charge amount to the second charge amount, the charging time of the electrode 2210 may be increased. The processor 2230 may detect that the charging time of the electrode 2210 of FIG. 22B is increased based on the input voltage input from the electrode 2210.

In an embodiment, the processor 2230 may determine that the aerosol generating article 2205 is inserted, when detecting that the charging time of the electrode 2210 is increased. In another embodiment, the processor 2230 may determine that the charging voltage of the electrode 2210 is decreased based on the fact that the charging time of the electrode 2210 is increased, and may determine that the aerosol generating article 2205 is inserted based on the decreased charging voltage.

In an embodiment, when it is determined that the aerosol generating article 2205 is inserted, the processor 2230 may apply power to the heater 2260 from the battery 2220. In this case, the heater 2260 may be an internal heating type heater. However, the heater 2260 is not limited thereto and may include at least one of an external heating type heater, an induction coil, and a susceptor.

Figure 23:
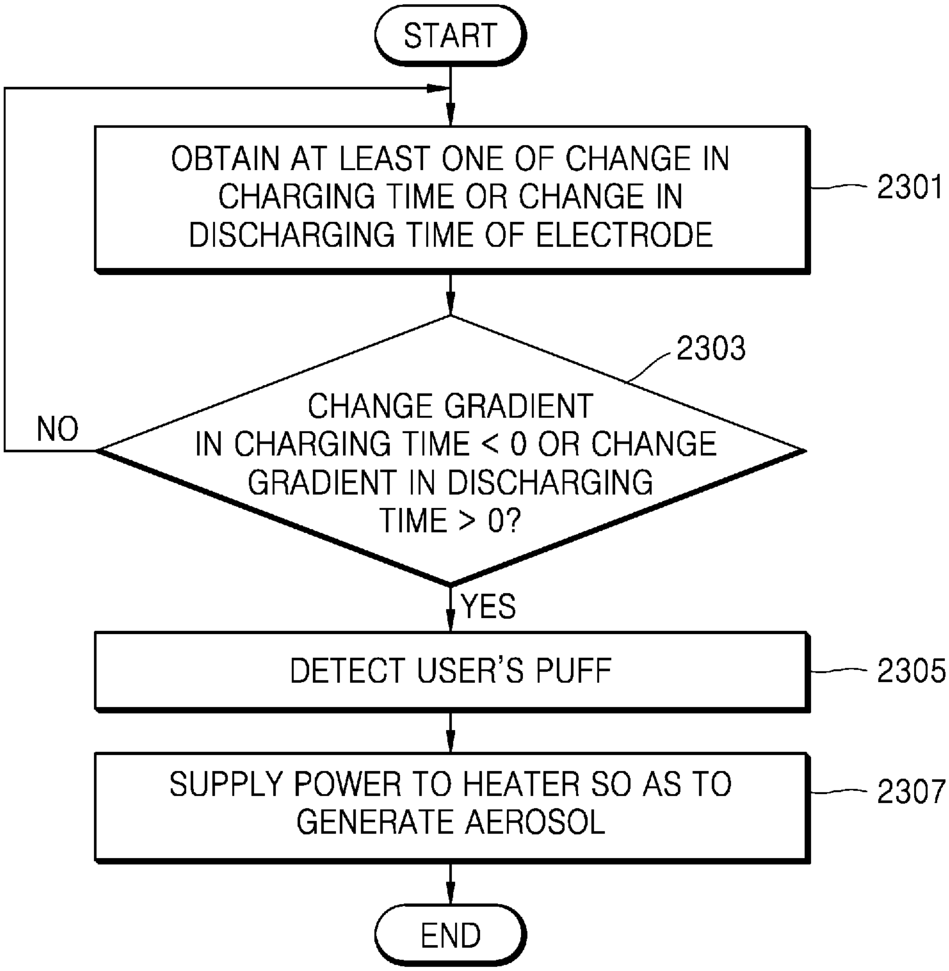
FIG. 23 is a flowchart illustrating a case where an aerosol generating device according to an embodiment detects a user's puff operation.

FIG. 23 is a flowchart illustrating a case where an aerosol generating device according to an embodiment detects the user's puff. The flowchart of FIG. 23 may correspond to a first operation of the processor in the (ii) segment of FIG. 19.

Referring to FIG. 23, a processor (e.g., the processor 1530 of FIG. 15) may obtain at least one of a change in a charging time and a change in a discharging time of the electrode (e.g., the electrode 1510 of FIG. 15) in operation 2301. In an embodiment, the processor 1530 may detect a change in the amount of aerosol generated by a heater (e.g., the heater 1540 of FIG. 15) based on a change in the charging time or a change in the discharging time of the electrode. For example, the processor 1530 may obtain the change in the charging time of the electrode 1510 based on the input voltage (e.g., the input voltage in FIGS. 17A, 17B, 18A and 18B) input from the electrode 1510. When the charging time to the electrode 1510 is decreased within a certain time, the processor 1530 may determine that the aerosol generated by the heater 1540 has been removed.

According to an embodiment, the processor 1530 may determine whether a change gradient in the charging time of the electrode 1510 is a negative value or a change gradient in the discharging time of the electrode 1510 is a positive value in operation 2303. For example, when the change gradient in the charging time of the electrode 1510 is a negative value or a change gradient in the discharging time of the electrode 1510 is a positive value, the processor 1530 may determine that the aerosol generated by the heater 1540 is decreased by the user's puff.

According to an embodiment, when the change gradient in the charging time of the electrode 1510 is a negative value or a change gradient in the discharging time of the electrode 1510 is a positive value, the processor 1530 may detect the user's puff in operation 2305. According to an embodiment, when the change gradient in the charging time of the electrode 1510 is 0 or more or the change gradient in the discharging time of the electrode 1510 is 0 or less, the processor 1530 may go back to operation 2301.

According to an embodiment, when the user's puff is detected, the processor 1530 may supply power to the heater 1540 so as to generate the aerosol in operation 2307. For example, the processor 1530 may supply certain power to the heater 1540 so as to generate the amount of aerosol decreased by the user's puff.

Figure 24:
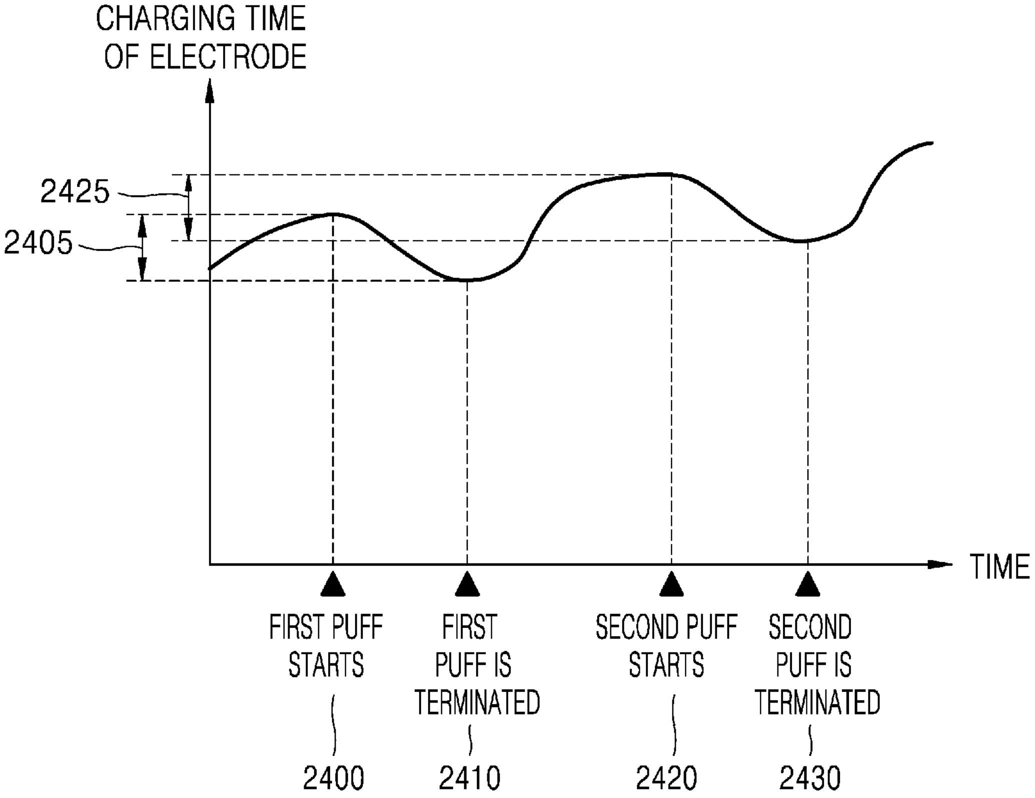
FIG. 24 is a graph illustrating a charging time of an electrode that varies as the user's puff operation is detected by an aerosol generating device according to an embodiment.

FIG. 24 is a graph showing a charging time of an electrode that varies as the user's puff is detected in an aerosol generating device according to an embodiment.

Referring to FIG. 24, a processor (e.g., the processor 1530 of FIG. 15) may obtain data on the user's puff by monitoring the charging time of the electrode (e.g., the electrode 1510 of FIG. 15).

In an embodiment, the processor 1530 may detect the user's puff based on the change in the charging time of the electrode 1510.

In an embodiment, when the change gradient in the charging time of the electrode 1510 is a negative value, the processor 1530 may detect the user's first puff. For example, when detecting the change gradient in the charging time of the electrode 1510 is switched from 0 to a negative value, the processor 1530 may determine that the user's first puff starts at the time point 2400. When detecting the change gradient in the charging time of the electrode 1510 is switched from the negative value to 0, the processor 1530 may determine that the user's first puff is terminated at the time point 2410. In another example, when the change gradient in the charging time of the electrode 1510 is maintained at a negative value for the certain time, the processor 1530 may determine that the certain time is a user's first puff segment.

In another embodiment, when a change 2405 in the charging time of the electrode 1510 exceeds a designated change amount or more, the processor 1530 may detect the user's first puff. For example, when the designated change amount is 0.5 seconds and the change 2405 in the charging time of the electrode 1510 is 0.8 seconds, the processor 1530 may determine that the user's puff has occurred. On the other hand, the processor 1530 may also detect the user's puff through a change in a charging voltage. That is, when the charging voltage of the electrode 1510 is increased by the designated change amount or more, the processor 1530 may detect the user's first puff.

In an embodiment, the charging time of the electrode 1510 may gradually increase from the time point 2410 at which the first puff is terminated to the time point 2420 at which a second puff starts. For example, when the user's first puff is terminated, the aerosol may be generated from the aerosol generating article before the next puff starts, and thus a capacitance of the electrode 1510 may be changed due to the generated aerosol. As the capacitance of the electrode 1510 is changed, the charging time of the electrode 1510 may gradually increase from the time point 2410 at which the first puff is terminated to the time point 2420 at which the second puff starts being performed, and thus a change gradient in the charging time of the electrode 1510 may be a positive value.

In an embodiment, when the change gradient in the charging time of the electrode 1510 is a negative value, the processor 1530 may detect the user's second puff. For example, when the processor 1530 detects that the change gradient in the charging time of the electrode 1510 after the time point 2410 at which the first puff is terminated is switched from 0 into a negative value, the processor 1530 may determine that the user's second puff starts at the time point 2420. When the processor 1530 detects that the change gradient in the charging time of the electrode 1510 is switched from the negative value to 0, the processor 1530 may determine that the detection time point to be a time point 2430 at which the user's second puff is terminated. In another example, when a change gradient in the charging time of the electrode 1510 is maintained at a negative value for a certain time, the processor 1530 may detect the certain time to be the user's second puff segment.

Figure 25A:
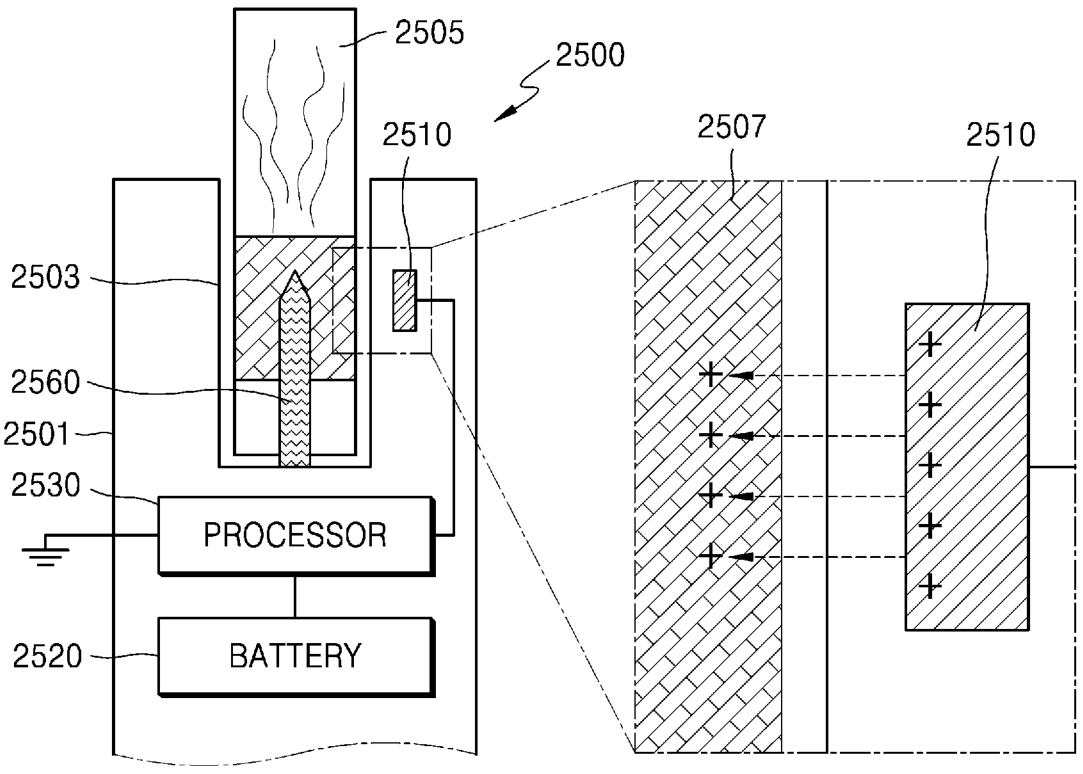
FIG. 25A illustrates a state before a user's puff operation is detected by an aerosol generating device according to an embodiment.
Figure 25B:
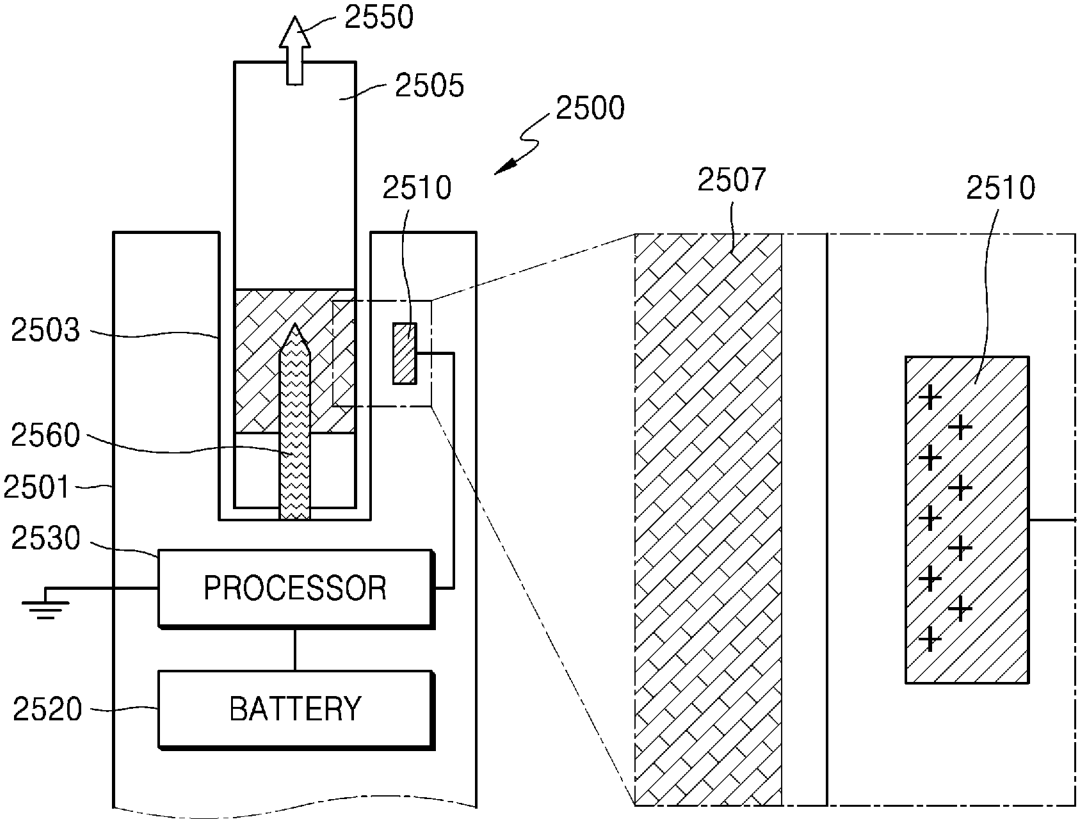
FIG. 25B illustrates a state after the user's puff operation is detected by an aerosol generating device according to an embodiment.

FIG. 25A illustrates a state before the user's puff is detected in an aerosol generating device according to an embodiment. FIG. 25B illustrates a state after the user's puff is detected in an aerosol generating device according to an embodiment.

Referring to FIGS. 25A and 25B, an aerosol generating device 2500 may include a housing 2501, an electrode 2510, a battery 2520, a processor 2530, and a heater 2560.

The electrode 2510 of FIG. 25A may lose positive (+) charges by moisture of a component (e.g., a tobacco material 2507) included in an aerosol generating article 2505. For example, the aerosol may be generated as the aerosol generating article 2505 is heated by the heater 2560, and the electrode 2510 of FIG. 25A may lose positive (+) charges by the generated aerosol and may include positive (+) charges of a first charge amount. Thereafter, when the generated aerosol is removed by the user's puff 2550, the electrode 2510 of FIG. 25B may include positive (+) charges of a second charge amount that is greater than the first charge amount.

As shown in FIG. 25B, when the positive (+) charges of the electrode 2510 are increased from the first charge amount to the second charge amount, the charging time of the electrode 2510 may be decreased. The processor 2530 may detect that the charging time of the electrode 2510 of FIG. 25B is decreased based on the input voltage input from the electrode 2510.

In an embodiment, the processor 2530 may determine that the user's puff 2550 has occurred, when detecting that the charging time of the electrode 2510 is decreased. In another embodiment, the processor 2530 may determine that the charging voltage of the electrode 2510 is increased based on a reduction in the charging time of the electrode 2510 and may also determine that the user's puff 2550 has occurred based on the increased charging voltage.

In an embodiment, the processor 2530 may count the number of the user's puff 2550. In this case, when the number of counted puffs exceeds a maximum number of puffs preset for the aerosol generating article 2505, the processor 2530 may limit the supply of power to the heater 2560. For example, when the maximum number of puffs preset for the aerosol generating article 2505 is 15 times and the current number of counted puffs is 5 times, the processor 2530 may supply power so as to heat the aerosol generating article 2505 by using the heater 2560. In another example, when the maximum number of puffs preset for the aerosol generating article 2505 is 15 times and the current number of counted puffs is 16 times, the processor 2530 may limit the supply of power to the heater 2560 so as to stop heating of the aerosol generating article 2505 by the heater 2560.

Figure 26:
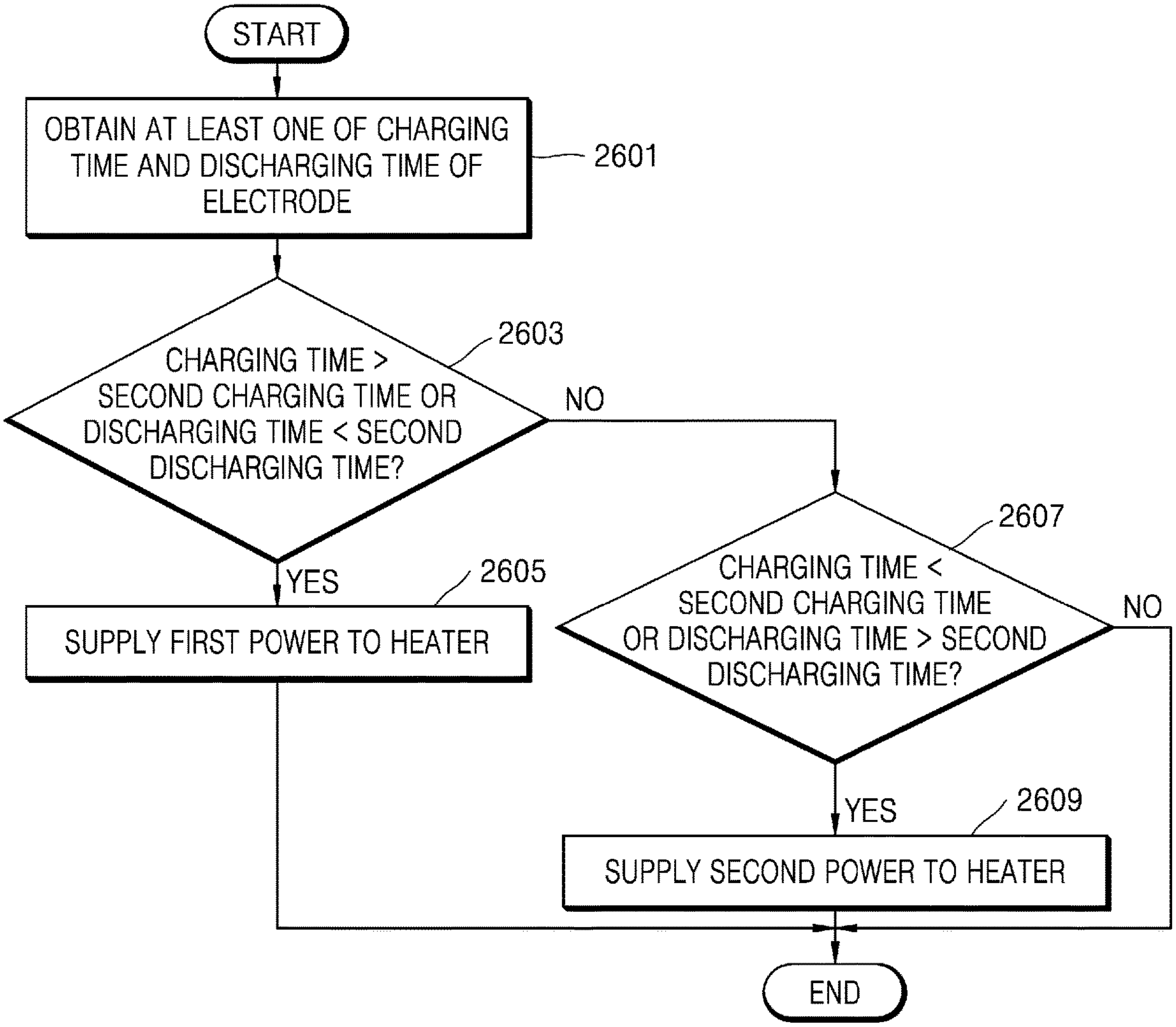
FIG. 26 is a flowchart illustrating a case where power supplied to a heater is controlled by an aerosol generating device according to an embodiment.

FIG. 26 is a flowchart illustrating a case where power supplied to a heater is controlled by an aerosol generating device according to an embodiment. The flowchart of FIG. 26 may correspond to a second operation of the processor in the (ii) segment of FIG. 19.

Referring to FIG. 26, the processor (e.g., the processor 1530 of FIG. 15) may obtain at least one of a charging time and a discharging time of the electrode (e.g., the electrode 1510 of FIG. 15) in operation 2601. In an embodiment, the processor 1530 may obtain the charging time of the electrode 1510 based on the input voltage (e.g., the input voltage in FIGS. 17A, 17B, 18A and 18B) input from the electrode 1510. For example, the charging time of the electrode 1510 may refer to a charging time taken for the charging voltage of the electrode 1510 to reach a preset reference voltage (e.g., the reference voltage $V_{ref}$ in FIGS. 17A, 17B, 18A and 18B). In another embodiment, the processor 1530 may obtain the charging time of the electrode 1510 based on the input voltage input from the electrode 1510. For example, the discharging time of the electrode 1510 may refer to a discharging time taken for the charging voltage of the electrode 1510 to reach 0 V.

According to an embodiment, the processor 1530 may determine whether the charging time of the electrode 1510 is longer than a designated second charging time or whether the discharging time of the electrode 1510 is shorter than a designated second discharging time in operation 2603. For example, the designated second charging time and the designated second discharging time may refer to a charging time and a discharging time, respectively, which are taken for the charging voltage of the electrode 1510 to reach a certain voltage with which the aerosol generating article may be heated and generate a reference atomization amount of aerosol. In this case, the reference atomization amount may refer to a reference generation amount that is determined such that a uniform aerosol amount is provided to the user by the aerosol generating article.

According to an embodiment, when the charging time of the electrode is longer than the designated second charging time or the discharging time of the electrode is shorter than the designated second discharging time, the processor 1530 may supply first power that is lower than reference power to the heater 1540 in operation 2605. According to an embodiment, when the charging time of the electrode is not longer than the designated second charging time or the discharging time of the electrode is not shorter than the designated second discharging time, the processor 1530 may determine whether the charging time of the electrode is shorter than the second charging time or whether the discharging time of the electrode is longer than the designated second discharging time in operation 2607. According to an embodiment, when the charging time of the electrode is shorter than the designated second charging time or the discharging time of the electrode is longer than the designated second discharging time, the processor 1530 may supply second power that is higher than reference power to the heater in operation 2609. According to an embodiment, when the charging time of the electrode is equal to the designated second charging time or the discharging time of the electrode is equal to the designated second discharging time, the processor 1530 may terminate an operation without supplying power to the heater 1540.

For example, the processor 1530 may supply reference power to the heater 1540 so that aerosol may be generated from the aerosol generating article. In this case, the heating temperature of the heater 1540 to which reference power is supplied may be 250° C.

The processor 1530 may obtain the charging time or the discharging time of the electrode, and may determine whether the obtained charging time of the electrode is longer than the designated second charging time or whether the discharging time of the electrode is shorter than the designated second discharging time. When the obtained charging time of the electrode is longer than the designated second charging time or the discharging time of the electrode is shorter than the designated second charging time, the processor 1530 may control power supplied to the heater 1540 so as to lower the heating temperature of the heater 1540. That is, the processor 1530 may determine that the amount of generated aerosol is greater than the reference atomization amount, and may set power supplied to the heater 1540 to be first power that is lower than the reference power so as to lower the heating temperature of the heater 1540 from 250° C. to 230° C.

When the obtained charging time of the electrode is shorter than the designated second charging time or the discharging time of the electrode is longer than the designated second discharging time, the processor 1530 may control power supplied to the heater 1540 so as to increase the heating temperature of the heater 1540. That is, the processor 1530 may determine that the amount of generated aerosol is less than the reference atomization amount, and may set power supplied to the heater 1540 to be second power that is higher than the reference power so as to increase the heating temperature of the heater 1540 from 250° C. to 270° C.

Figure 27:
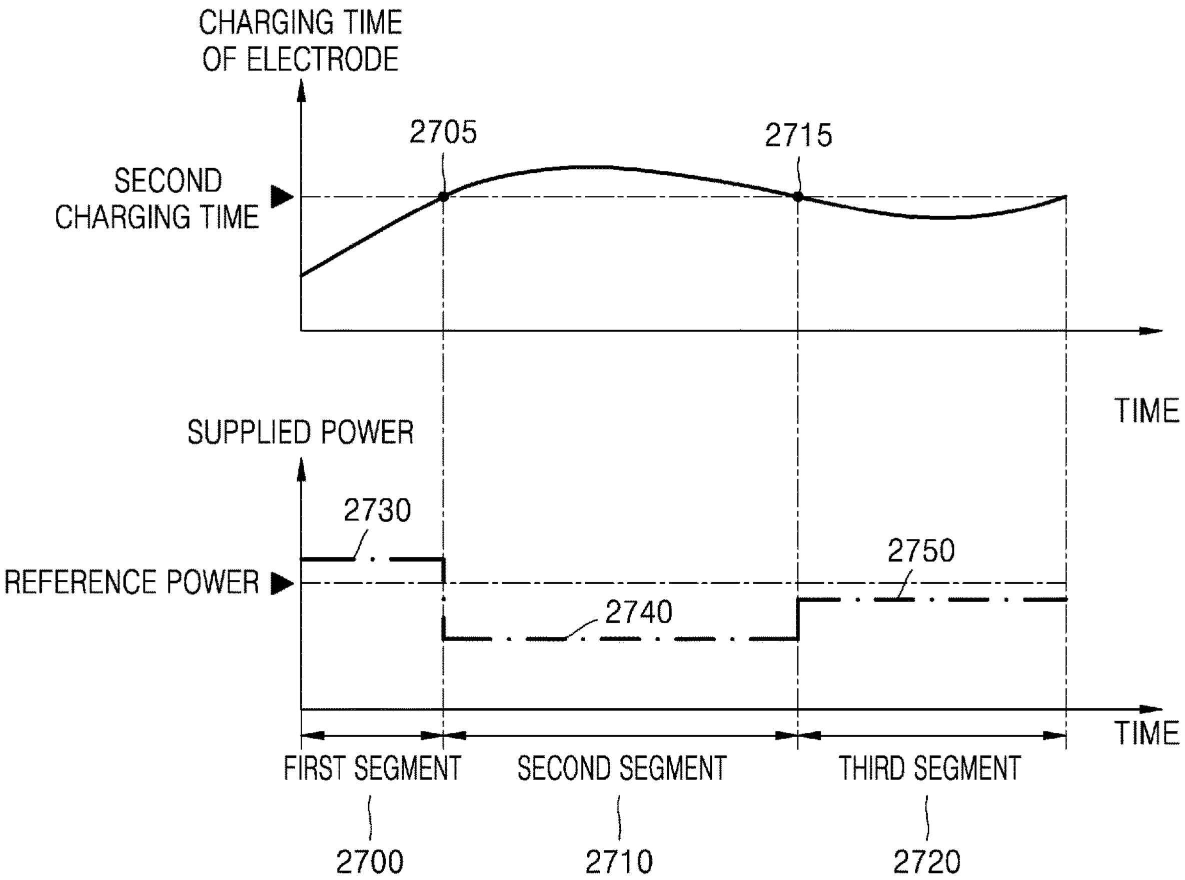
FIG. 27 is a graph illustrating power supplied to a heater that is controlled based on a charging time of an electrode in an aerosol generating device according to an embodiment.

FIG. 27 is a graph illustrating power supplied to a heater that is controlled based on a charging time of an electrode in an aerosol generating device according to an embodiment.

Referring to FIG. 27, a processor (e.g., the processor 1530 of FIG. 15) may control power supplied to a heater (e.g., the heater 1540 of FIG. 15) so that the uniform amount of aerosol is generated from the aerosol generating article.

In an embodiment, the processor 1530 may detect the charging time of an electrode that is shorter than the designated second charging time in a first segment 2700. In this case, the processor 1530 may determine that the amount of aerosol generated from the aerosol generating article is less than the reference atomization amount, based on the detected charging time of the electrode. Thus, the processor 1530 may supply first power 2730 that is higher than the reference power to the heater 1540 so that the amount of aerosol may reach the reference atomization amount in the first segment 2700. As the power supplied to the heater 1540 is set to be the first power 2730, the charging time of the electrode may be gradually increased and may reach (2705) the designated second charging time. Then, the charging time of the electrode may exceed the designated second charging time after reaching (2705) the designated second charging time.

In this case, the processor 1530 may supply second power 2740 that is lower than the reference power to the heater 1540 so that the amount of aerosol may reach the reference atomization amount in a second segment 2710. As the power supplied to the heater 1540 is set to be second power 2740, the charging time of the electrode may be gradually decreased and may reach (2715) the designated second charging time. Then, the charging time of the electrode may become less than the designated second charging time after reaching (2715) the designated second charging time.

In this case, the processor 1530 may supply third power 2750 that is higher than the reference power and lower than the first power 2730 to the heater 1540 so that the amount of aerosol may reach the reference atomization amount in a third segment 2720. As power supplied to the heater 1540 is set to be the third power 2750, the charging time of the electrode may be gradually increased.

In an embodiment, from the first segment 2700 to the third segment 2720, a difference between the amount of generated aerosol and the reference atomization amount may be gradually decreased. That is, as the processor 1530 controls the power supplied to the heater 1540 based on the charging time of the electrode, the amount of generated aerosol may converge to the reference atomization amount.

Figure 28:
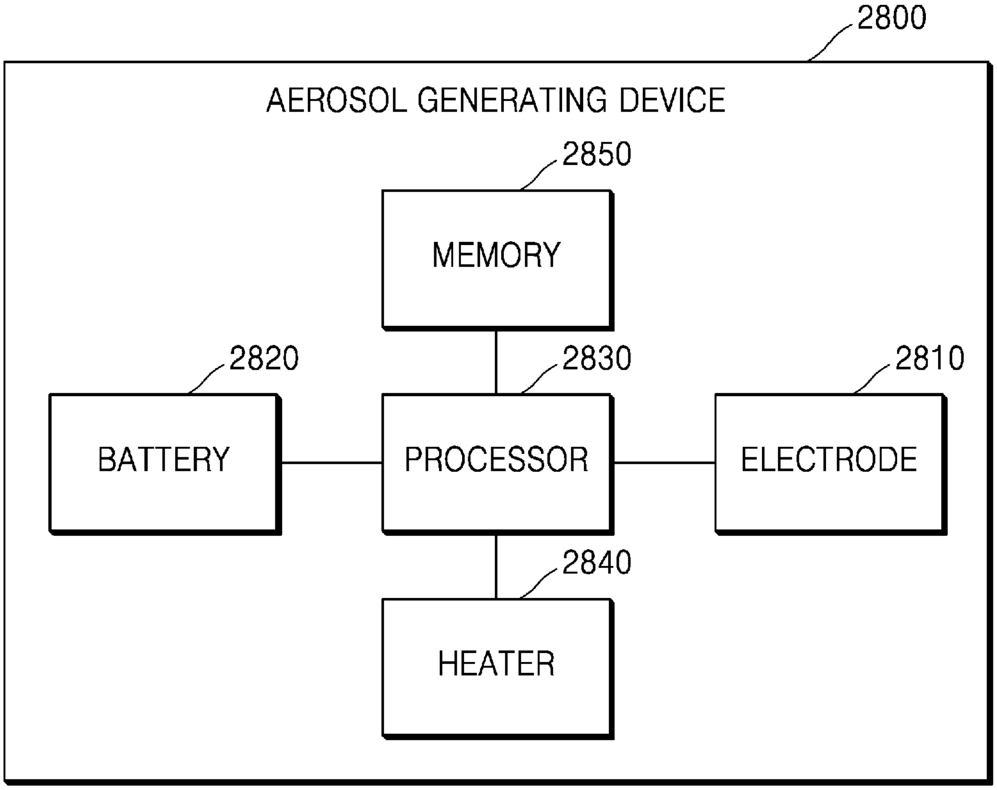
FIG. 28 is a block diagram of an aerosol generating device according to another embodiment.

FIG. 28 is a block diagram of an aerosol generating device according to another embodiment.

Referring to FIG. 28, an aerosol generating device 2800 may include an electrode 2810, a battery 2820, a processor 2830, a heater 2840, and a memory 2850. The electrode 2810, the battery 2820, the processor 2830, and the heater 2840 of FIG. 28 may correspond to the electrode 2510, the battery 1520, the processor 1530, and the heater 1540 of FIG. 15, respectively. Thus, a redundant description therewith may be omitted.

In an embodiment, the processor 2830 may store data on the user's smoking pattern in the memory 2850. For example, data on the user's smoking pattern may include at least one of data on the user's puff period and data on the user's puff time (i.e., an inhalation time).

In an embodiment, the processor 2830 may obtain the data on the user's smoking pattern from the memory 2850, thereby setting a reference atomization amount for the aerosol generating article. The processor 2830 may control power supplied to the heater 2840 so that the amount of aerosol may reach the reference atomization amount set based on the data on the user's smoking pattern.

In an embodiment, the processor 2830 may obtain data on the user's puff period from the memory 2850. When a second puff will start after a first puff has occurred may be determined based on the obtained data on the user's puff period. Thus, after the first puff has occurred, the processor 2830 may control power supplied to the heater 2840 so that aerosol of the reference atomization amount may be generated from the aerosol generating article before the second puff starts.

In an embodiment, the processor 2830 may obtain data on the user's puff time (i.e., an inhalation time) from the memory 2850. The reference atomization amount on the amount of aerosol may be set based on the obtained data on the user's puff time (i.e., the inhalation time). Thus, the processor 2830 may control power supplied to the heater 2840 so that aerosol of the reference atomization amount may be generated from the aerosol generating article.

In an embodiment, the processor 2830 may monitor the charging time of the electrode 2810 and may obtain puff data relating to the user's puff based on the result of monitoring. For example, the puff data relating to the user's puff may refer to puff data updated from the user's existing puff data. The processor 2830 may store "5.5 seconds" to the user's existing puff period in the memory 2850. Thereafter, as a result of monitoring of the charging time of the electrode 2810, when the user's puff period is changed to "7 seconds", the processor 2830 may reflect updated puff data "user's puff period=7 seconds" on the data on the user's smoking pattern and store the updated puff data in the memory 2850.

Figure 29:
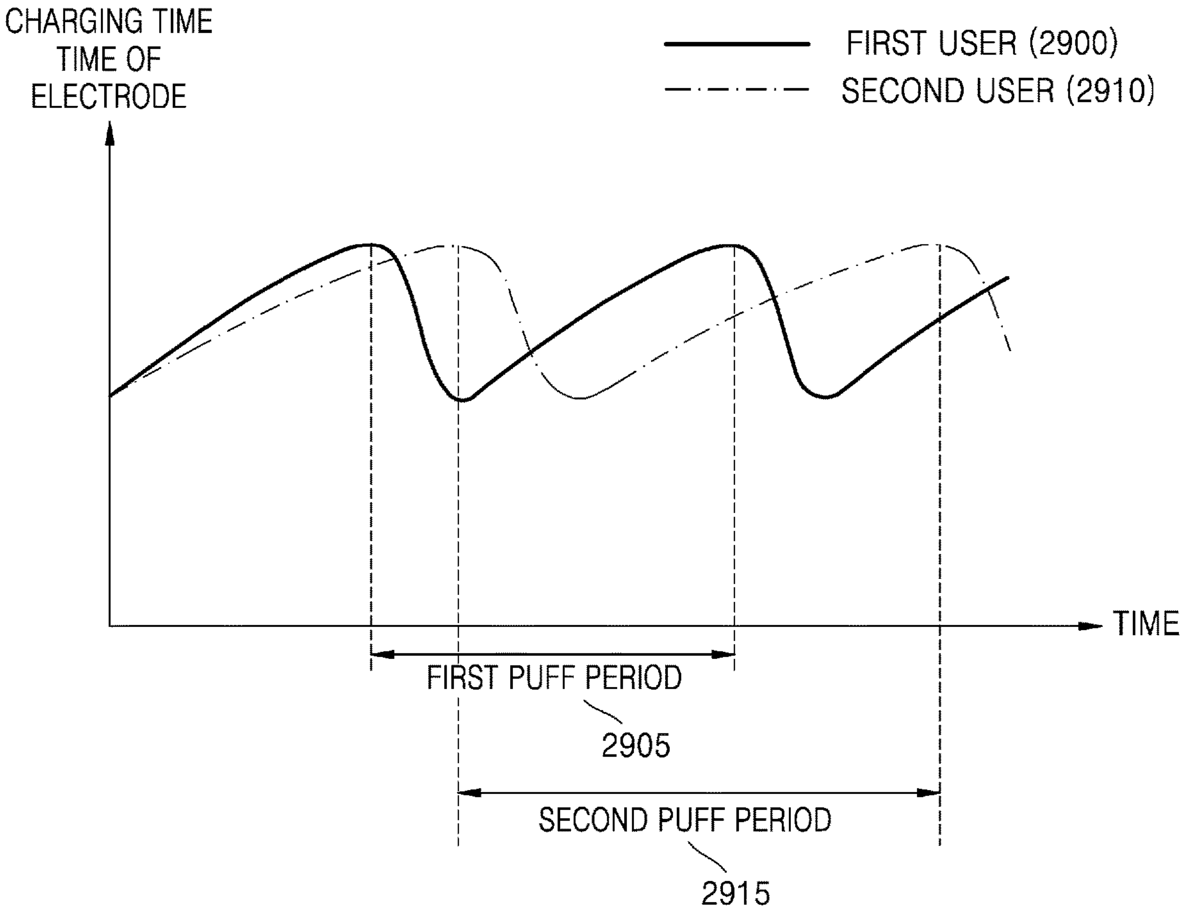
FIG. 29 is a graph illustrating a charging time of an electrode that varies according to a user's smoking pattern according to an embodiment.

FIG. 29 is a graph showing a charging time of an electrode that varies according to the user's smoking pattern according to an embodiment.

Referring to FIG. 29, a processor (e.g., the processor 2830 of FIG. 28) may monitor the charging time of an electrode (e.g., the electrode 2810 of FIG. 28) to obtain data on the user's puff period and to store the obtained data on the user's puff period in the memory 2850. For example, when a first user 2900 smokes through an aerosol generating device (e.g., the aerosol generating device 2800 of FIG. 28), the processor 2830 may obtain a first puff period 2905 as data on the puff period of the first user 2900. In another example, when the second user 2910 smokes through the aerosol generating device 2800, the processor 2830 may obtain a second puff period 2915 that is longer than the first puff period 2905 as data on the puff period of the second user 2910.

If aerosol of the same reference atomization amount is to be provided to the first user 2900 and the second user 2910 having different puff periods, the processor 2830 may control power supplied to a heater (e.g., the heater 2840 of FIG. 28) based on the user's puff period.

For example, the processor 2830 may control power supplied to the heater 2840 to be first power so that aerosol of the reference atomization amount may be generated for a first puff period 2905 (e.g., 5 seconds) from a time point at which the puff of the first user 2900 starts. In another example, the processor 2830 may control power supplied to the heater 2840 to be second power that is lower than the first power, so that aerosol of the reference atomization amount may be generated for a second puff period 2915 (e.g., 8 seconds) from a time point at which the puff of the second user 2910 starts.

Figure 30:
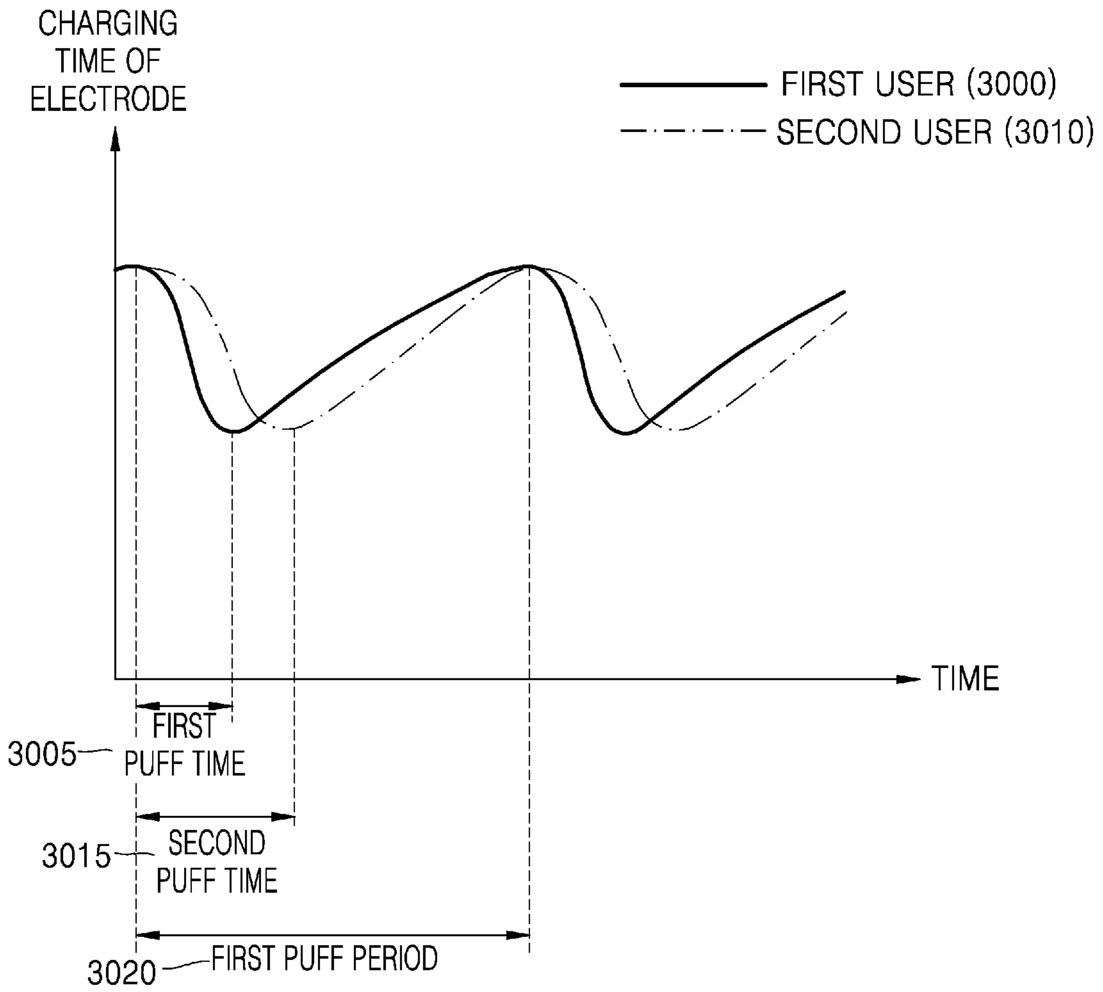
FIG. 30 is a graph illustrating a charging time of an electrode that varies according to a user's smoking pattern according to another embodiment.

FIG. 30 is a graph illustrating a charging time of an electrode that varies according to a user's smoking pattern according to another embodiment.

Referring to FIG. 30, a processor (e.g., the processor 2830 of FIG. 28) may monitor the charging time of an electrode (e.g., the electrode 2810 of FIG. 28) to obtain data on the user's puff time (i.e., an inhalation time) and to store the obtained data on the user's puff time in a memory (e.g., the memory 2850 of FIG. 28). For example, when the first user 3000 smokes for a first puff period 3020 through an aerosol generating device (e.g., the aerosol generating device 2800 of FIG. 28), the processor 2830 may obtain a first puff time 3005 as data on a puff time of the first user 3000. In another example, when the second user 3010 smokes for the first puff period 3020 through the aerosol generating device 2800, the processor 2830 may obtain a second puff time 3015 as data on a puff time of the second user 3010.

When aerosol of the same atomization amount is to be provided to the first user 3000 and the second user 3010 having different puff times (i.e., inhalation times), the processor 2830 may set a reference atomization amount based on the user's puff time. For example, for the first user 3000 who inhales the aerosol for the first puff time 3005 (e.g., 1 second) at the first puff period 3020, the processor 2830 may set a reference atomization amount on the first user 3000 to be a first reference atomization amount. In another example, for the second user 3010 who inhales the aerosol for the second puff time 3015 that is longer than the first puff time 3005 at the first puff period 3020, the processor 2830 may set a reference atomization amount on the second user 3010 to be a second reference atomization amount that is less than the first reference atomization amount.

As the reference atomization amount is set based on the user's puff time, the maximum number of puffs (e.g., 15 times) of the aerosol generating article may be equally provided to users having different puff times.

Figure 31:
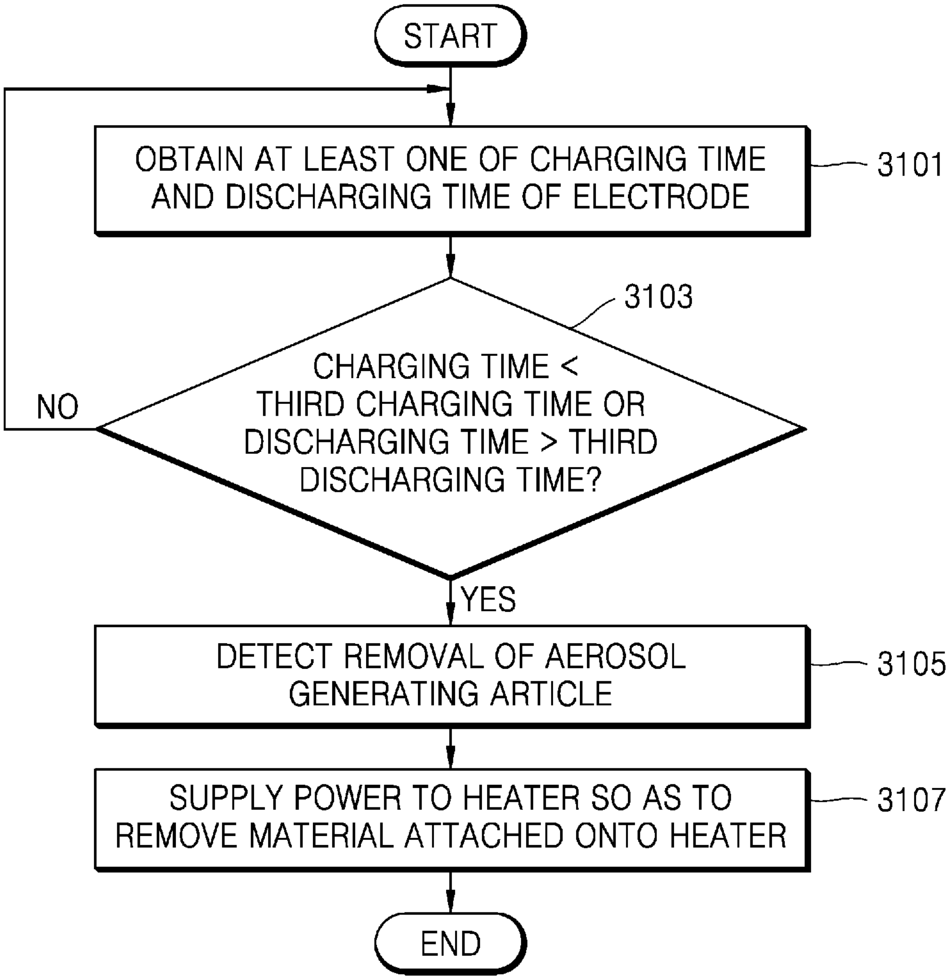
FIG. 31 is a flowchart illustrating a case where an aerosol generating device according to an embodiment detects the removal of an aerosol generating article.

FIG. 31 is a flowchart illustrating a case where an aerosol generating device according to an embodiment detects the removal of an aerosol generating article. The flowchart of FIG. 31 may correspond to an operation of a processor in the (iii) segment of FIG. 19.

Referring to FIG. 31, a processor (e.g., the processor 1530 of FIG. 15) may obtain at least one of a charging time and a discharging time of an electrode (e.g., the electrode 1510 of FIG. 15) in operation 3101. In an embodiment, the processor 1530 may obtain the charging time of the electrode 1510 based on the input voltage (e.g., the input voltage in FIGS. 17A, 17B, 18A and 18B) input from the electrode 1510. For example, the charging time of the electrode 1510 may refer to a time taken for the charging voltage of the electrode 1510 to reach a preset reference voltage (e.g., the reference voltage $V_{ref}$ in FIGS. 17A, 17B, 18A and 18B). In another embodiment, the processor 1530 may obtain the discharging time of the electrode 1510 based on the input voltage input from the electrode 1510. For example, the discharging time of the electrode may refer to a time taken for the charging voltage of the electrode 1510 to reach 0 V.

According to an embodiment, the processor 1530 may determine whether the charging time of the electrode is shorter than a designated third charging time or whether the discharging time of the electrode is longer than a designated third discharging time in operation 3103. For example, the designated third charging time and the designated third discharging time may refer to a charging time and a discharging time, respectively, which are taken for the charging voltage of the electrode 1510 to reach a preset reference voltage $V_{ref}$ after having increased as the aerosol generating article is removed.

According to an embodiment, when the charging time of the electrode is shorter than the designated third charging time or the discharging time of the electrode is longer than the designated third discharging time, the processor 1530 may detect removal of the aerosol generating article in operation 3105. According to an embodiment, when the charging time of the electrode is longer than the designated third discharging time or the discharging time of the electrode is shorter than the designed third discharging time, the processor 1530 may go back to operation 3101.

According to an embodiment, the processor 1530 may supply power to the heater 1540 so as to remove a material attached onto a heater (e.g., the heater 1540 of FIG. 15) in operation 3107. For example, when removal of the aerosol generating article is detected, the processor 1530 may perform a cleaning operation of removing the material attached onto the heater 1540 by heating the heater 1540 at a high temperature. In this case, the heating temperature of the heater 1540 for the cleaning operation may be higher than the heating temperature of the heater 1540 at which the aerosol generating article is heated. For example, in order to perform the cleaning operation, the processor 1530 may control power supplied to the heater 1540 so that the heater 1540 may have a temperature range of about 450° C. to about 550° C. More preferably, in order to perform the cleaning operation, the processor 1530 may control power supplied to the heater 1540 so that the heater 1540 may have a temperature range of about 500° C. to about 550° C. However, the heating temperature range for performing the cleaning operation of the heater 1540 is just an example and may be variously changed according to the design of the manufacturer.

In an embodiment, when removal of the aerosol generating article is detected, the processor 1530 may perform the cleaning operation of the heater 1540 automatically. For example, when removal of the aerosol generating article is detected from the aerosol generating device, the processor 1530 may automatically perform the cleaning operation of the heater 1540 after a designated time (e.g., 10 minutes) elapses from when the aerosol generating article is removed. In an embodiment, the processor 1530 may automatically stop the cleaning operation of the heater 1540 when insertion of the aerosol generating article is detected during the cleaning operation.

Figure 32:
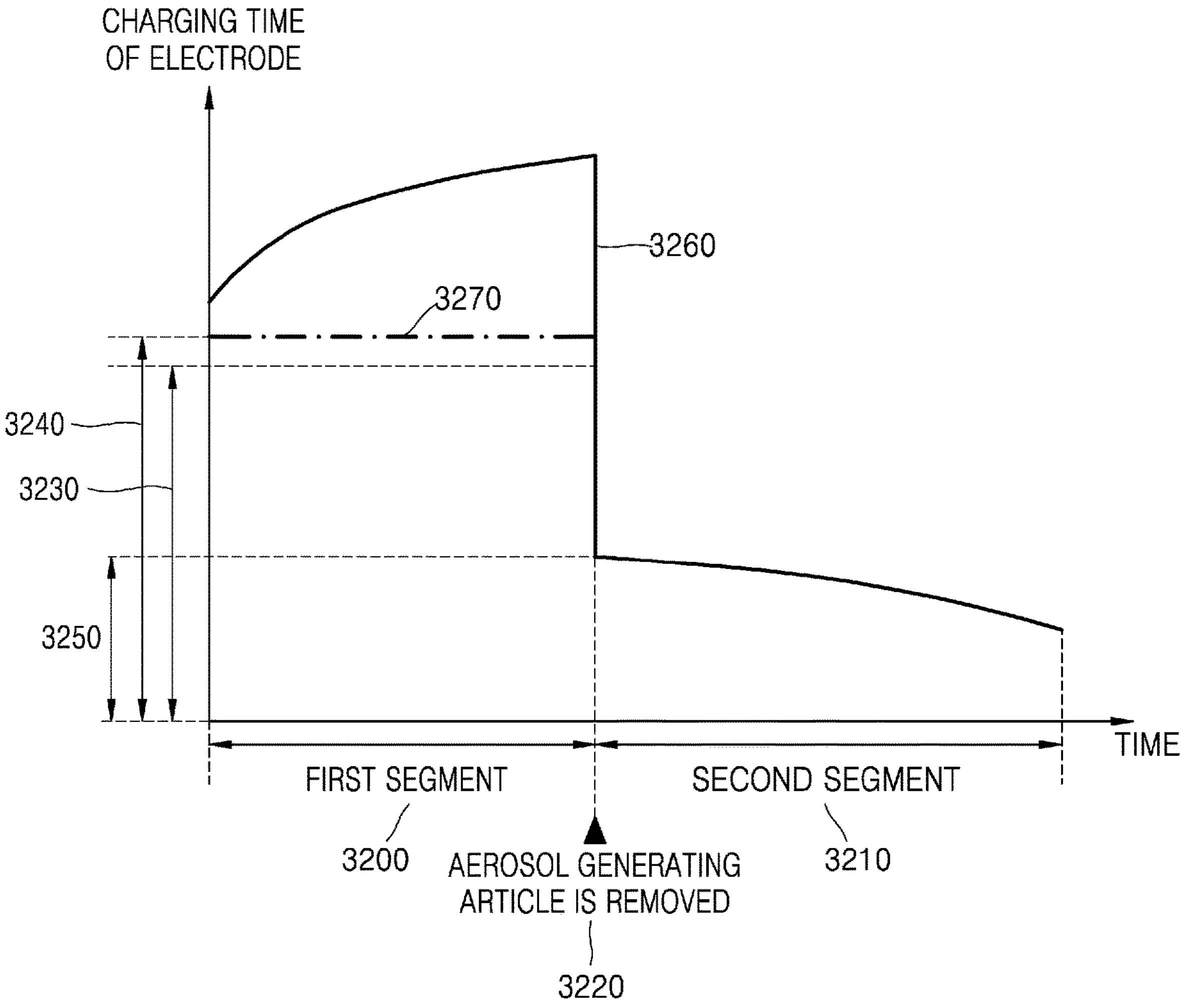
FIG. 32 is a graph illustrating a charging time of an electrode that varies as an aerosol generating article is removed from an aerosol generating device according to an embodiment.

FIG. 32 is a graph illustrating a charging time of an electrode that varies as an aerosol generating article is removed from an aerosol generating device according to an embodiment.

Referring to FIG. 32, a time segment at which insertion of an aerosol generating article into an aerosol generating device (e.g., the aerosol generating device 1500 of FIG. 15) is determined may be classified into a first segment 3200 and a second segment 3210. The first segment 3200 may correspond to a segment at which the aerosol generating article is inserted. The second segment 3210 may correspond to a segment after the aerosol generating article is removed.

In an embodiment, when smoking is performed before a time point 3220 at which the aerosol generating article is removed, the charging time of an electrode (e.g., the electrode 1510 of FIG. 15) may be increased in the first segment 3200. For example, as the aerosol generating article is heated in the first segment 3200, the temperature of a region in which the electrode is disposed may also be increased. As the temperature rises, a charging time required for charging the electrode may be gradually increased.

When smoking is performed before the time point 3220 at which the aerosol generating article is removed, as the aerosol generating article is removed, the charging time of the electrode may be reduced. In this case, the charging time of the electrode may be rapidly decreased. In an embodiment, when the charging time 3250 of the electrode is shorter than the designed third charging time 3230, the processor 1530 may determine that the aerosol generating article has been removed.

In another embodiment, when smoking is not performed (3270) before the time point 3220 at which the aerosol generating article is removed, the charging time of the electrode may be substantially uniform in the first segment 3200. Because the electrode may be continuously discharged even when it does not include an additional discharging circuit, the electrode may require a charging time for charging a charge amount lost as the electrode is continuously discharged. Thus, the processor 1530 may continuously apply a constant voltage to the electrode.

When smoking is not performed (3270) before the time point 3220 at which the aerosol generating article is removed, the charging time of the electrode may be reduced as the aerosol generating article is removed. In this case, the charging time of the electrode may be rapidly reduced. In an embodiment, when the charging time 3250 of the electrode is shorter than the designated third charging time 3230, the processor 1530 may determine that the aerosol generating article has been removed.

In an embodiment, the processor 1530 may determine whether to perform the cleaning operation of the heater 1540 in the second segment 3210 based on a change in the charging time of the electrode in the first segment 3200. For example, when a substantial change in the charging time of the electrode occurred in the first segment 3200, the processor 1530 may determine that smoking is performed (3260) before the time point 3220 at which the aerosol generating article is removed, and thus may perform a cleaning operation of the heater 1540 in the second segment 3210. In another example, when a substantial change in the charging time of the electrode did not occur in the first segment 3200, the processor 1530 may determine that smoking is not performed (3270) before the time point 3220 at which the aerosol generating article is removed, and thus may not perform the cleaning operation of the heater 1540 in the second segment 3210.

Figure 33A:
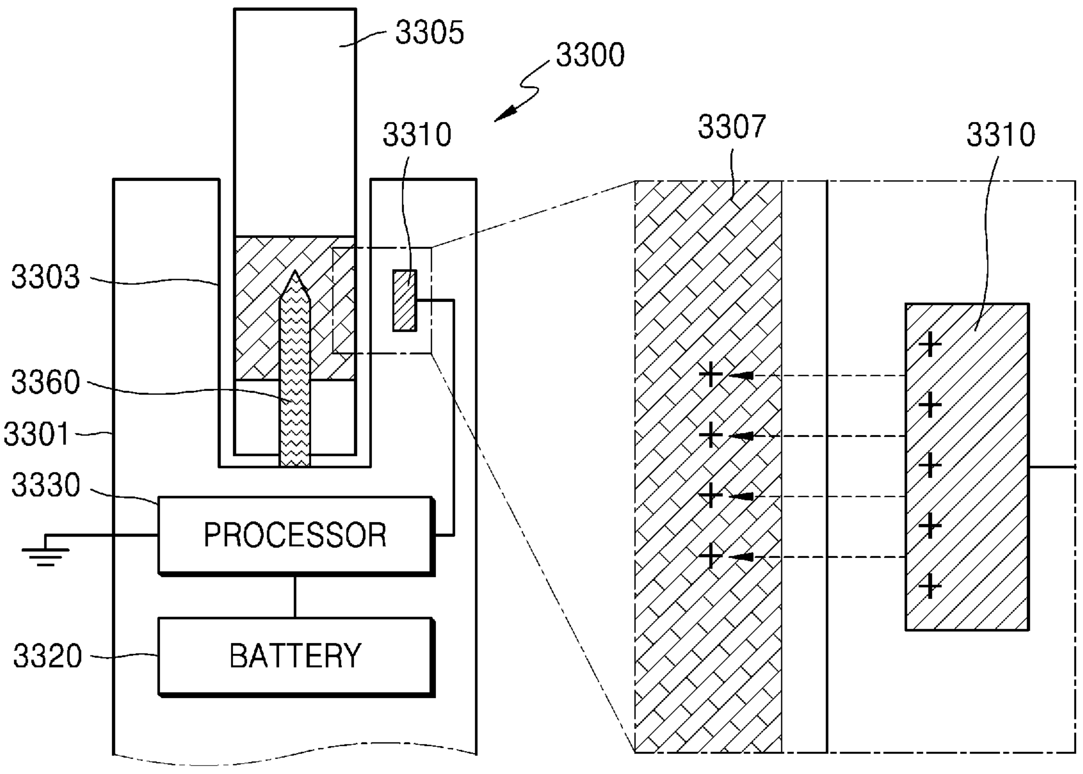
FIG. 33A illustrates a state before an aerosol generating article is removed from an aerosol generating device according to an embodiment.
Figure 33B:
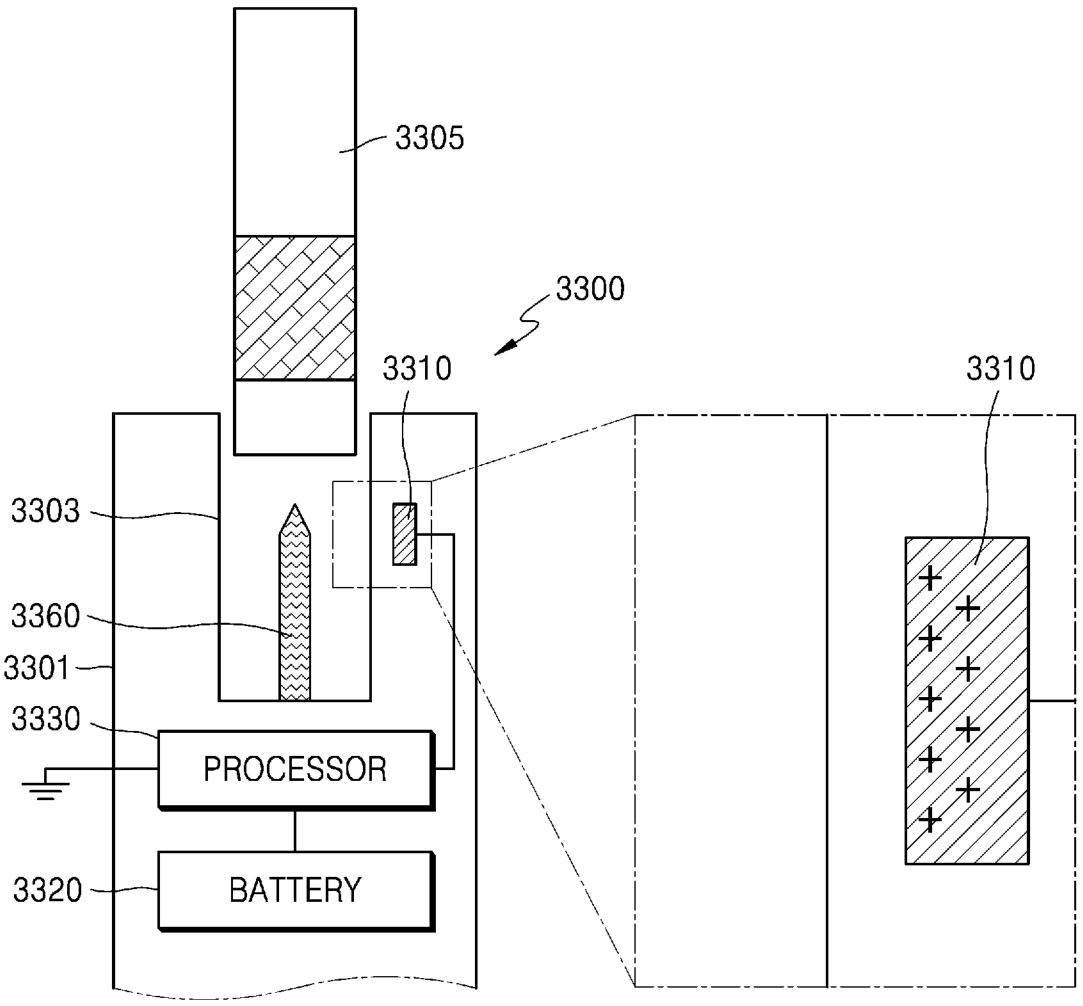
FIG. 33B illustrates a state after an aerosol generating article is removed from an aerosol generating device according to an embodiment.

FIG. 33A illustrates a state before an aerosol generating article is removed from an aerosol generating device according to an embodiment. FIG. 33B illustrates a state after an aerosol generating article is removed from an aerosol generating device according to an embodiment.

Referring to FIGS. 33A and 33B, an aerosol generating device 3300 may include a housing 3301, an electrode 3310, a battery 3320, a processor 3330, and a heater 3360.

The electrode 3310 of FIG. 33A may include positive (+) charges of a first charge amount. The first charge amount may refer to a charge amount remaining in the electrode 3310 after some of positive (+) charges have been lost by moisture of a component (e.g., a tobacco material 3307) included in the aerosol generating article 3305 disposed close to the electrode 3310, as shown in FIG. 33A. Thereafter, when the aerosol generating article 3305 is removed from the accommodation portion 3303 corresponding to the inner circumferential surface of the housing 3301, the electrode 3310 of FIG. 33B may include positive (+) charges of a second charge amount that is greater than the first charge amount.

As shown in FIG. 33B, when the positive (+) charges of the electrode 3310 are increased from the first charge amount to the second charge amount, the charging time of the electrode 3310 may be reduced. The processor 3330 may detect that the charging time of the electrode 3310 of FIG. 33B is reduced based on the input voltage input from the electrode 3310.

In an embodiment, the processor 3330 may determine that the aerosol generating article 3305 has been removed, when detecting that the charging time of the electrode 3310 is reduced. In another embodiment, the processor 3330 may determine that the charging voltage of the electrode 3310 is increased based on a reduction in the charging time of the electrode 3310, and may determine that the aerosol generating article 3305 has been removed based on the increased charging voltage.

In an embodiment, when it is determined that the aerosol generating article 3305 has been removed, the processor 3330 may perform a cleaning operation of the heater 3360. In an embodiment, when it is determined that the aerosol generating article 3305 has been removed, the processor 3330 may perform the cleaning operation of the heater 3360 after a designated time (e.g., 10 minutes) elapses from when the aerosol generating article 3305 is removed. In another embodiment, after it is determined that the aerosol generating article has been removed, when the user input for performing the cleaning operation of the heater 3360 is received, the processor 3330 may perform the cleaning operation of the heater 3360.

Figure 34:
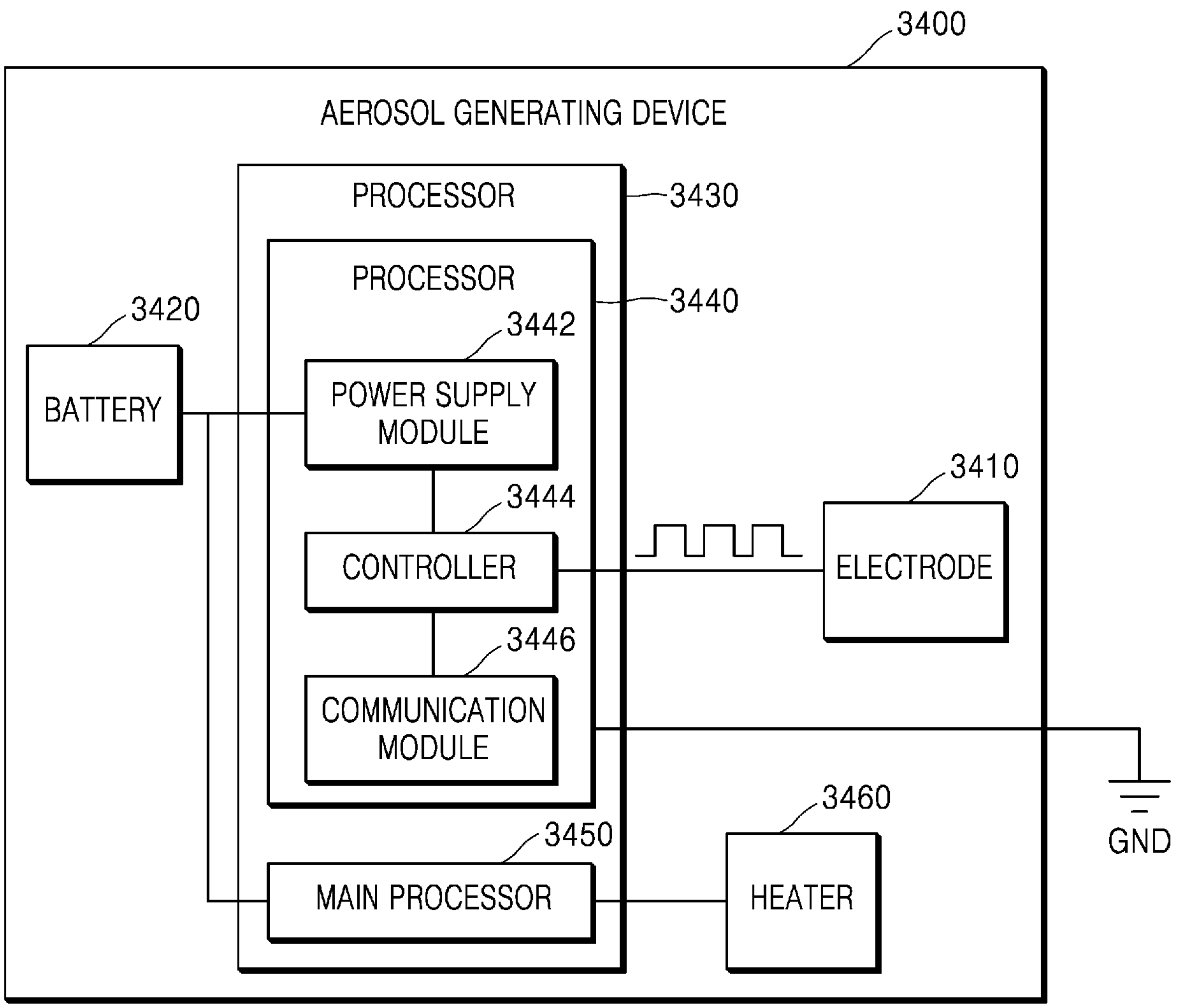
FIG. 34 is a block diagram of an aerosol generating device according to another embodiment.

FIG. 34 is a block diagram of an aerosol generating device according to another embodiment.

Referring to FIG. 34, an aerosol generating device 3400 may include an electrode 3410, a battery 3420, a processor 3430, and a heater 3460. The electrode 3410, the battery 3420, the processor 3430, and the heater 3460 of FIG. 34 may correspond to the electrode 1510, the battery 1520, the processor 1530, and the heater 1540 of FIG. 15. Thus, a redundant description therewith may be omitted.

In an embodiment, the processor 3430 may include a sensing processor 3440 and a main processor 3450. The sensing processor 3440 may include a power supply module 3442, a controller 3444, and a communication module 3446.

The power supply module 3442 may receive power from the battery 3420 and may supply the supplied power to the electrode 3410 through the controller 3444.

The controller 3444 may apply an output voltage to the electrode 3410 and may detect the input voltage input from the electrode 3410. In this case, the controller 3444 may adjust and apply the output voltage to the electrode 3410 in a PWM manner. In an embodiment, the controller 3444 and the electrode 3410 may be connected to each other via one line, and the controller 3444 may apply an output voltage to the electrode 3410 via the line and may detect the input voltage input from the electrode 3410. In another embodiment, the controller 3444 and the electrode 3410 may be connected to each other via at least two lines, and the controller 3444 may apply the output voltage to the electrode 3410 via one of at least two lines and may detect the input voltage input from the electrode 3410 via another line.

The communication module 3446 may transmit data on a change in the charging time of the electrode 3410 detected based on the input voltage input from the electrode 3410 to the main processor 3450.

In an embodiment, the main processor 3450 may determine insertion of the aerosol generating article based on data on the change in the charging time of the electrode 3410 received from the communication module 3446. When the data includes information indicating that the charging time of the electrode 3410 is increased, the main processor 3450 may determine that the aerosol generating article is inserted into the aerosol generating device 3410. When it is determined that the aerosol generating article is inserted, the main processor 3450 may apply power to the heater 3460 so as to perform a preheating operation by using the heater 3460.

In an embodiment, while the sensing processor 3440 monitors the charging time of the electrode 3410 periodically, the main processor 3450 may correspond to a low power mode (a sleep mode). When receiving information indicating that the charging time of the electrode 3410 is increased from the sensing processor 3440, the main processor 3450 may switch the power supply state of the main processor 3450 from a lower power mode to an active mode.

The description of the above-described embodiments is just an example, and those of ordinary skill in the art may understand that various changes and equivalent other embodiments can be made therefrom. Therefore, the true scope of protection of the present disclosure should be defined by the appended claims, and all differences within the scope of equivalents to those descried in the claims should be construed as being included in the protection scope defined by the claims.

What is claimed is:

1. An aerosol generating device comprising:
- a heater;
- a housing comprising an accommodation portion into which an aerosol generating article comprising a cigarette is to be inserted;
- a single electrode disposed to be apart from the aerosol generating article inserted into the accommodation portion and located to correspond to at least a part of the aerosol generating article; and
- a processor electrically connected to the heater and the single electrode,
- wherein the processor obtains a change in charge amounts of the single electrode according to a permittivity of moisture in the aerosol generating article.

2. The aerosol generating device of claim 1, wherein the heater comprises:
- a susceptor configured to heat the aerosol generating article; and
- a coil configured to induce a variable magnetic field to the susceptor,
- wherein the single electrode is disposed between the accommodation portion and the coil.

3. The aerosol generating device of claim 1, wherein the heater comprises:
- a susceptor configured to heat the aerosol generating article; and
- a coil configured to induce a variable magnetic field to the susceptor,
- wherein the single electrode and the coil are integrally formed.

4. The aerosol generating device of claim 1, wherein the heater is configured to heat an inside or an outside of the aerosol generating article in a resistive heating manner, and the single electrode is located to correspond to an overlapping area of the aerosol generating article and the heater.

5. The aerosol generating device of claim 1, wherein the single electrode is located to correspond to at least a part of an area of the aerosol generating article where an aerosol generating material is disposed, when the aerosol generating article is inserted.

6. The aerosol generating device of claim 1, wherein the processor obtains at least one of a charging time and a discharging time of the single electrode according to the obtained change in the charge amount of the single electrode, and when the charging time is longer than a designated first charging time or the discharging time is shorter than a designated first discharging time, the processor determines that insertion of the aerosol generating article occurred.

7. The aerosol generating device of claim 6, wherein the processor supplies power to the heater for preheating when insertion of the aerosol generating article is detected.

8. The aerosol generating device of claim 1, wherein the processor obtains at least one of a change in a charging time of the single electrode and a change in a discharging time of the single electrode according to the obtained change in the charge amount of the single electrode, and detects a user's puff based on the obtained change in the charging time or the obtained change in the discharging time of the single electrode.

9. The aerosol generating device of claim 8, wherein the processor detects the user's puff when a change gradient in the charging time with respect to time is a negative value or a change gradient in the discharging time with respect to time is a positive value.

10. The aerosol generating device of claim 9, wherein the processor supplies power to the heater to generate an aerosol, when the user's puff is detected.

11. The aerosol generating device of claim 1, wherein the processor obtains at least one of a charging time and a discharging time of the single electrode according to the obtained change in the charge amount of the single electrode, and controls power supplied to the heater based on the obtained charging time or discharging time.

12. The aerosol generating device of claim 11, wherein the processor supplies first power that is lower than reference power to the heater when the charging time is longer than a designated second charging time or the discharging time is shorter than a designated second discharging time, and supplies second power that is higher than the reference power to the heater when the charging time is shorter than the designated second charging time or the discharging time is longer than the designated second discharging time.

13. The aerosol generating device of claim 1, wherein the processor obtains at least one of a charging time and a discharging time of the single electrode according to the obtained change in the charge amount of the single electrode, and determines that removal of the aerosol generating article occurred when the charging time is shorter than a designated third charging time or the discharging time is longer than a designated third discharging time.

14. The aerosol generating device of claim 13, wherein the processor supplies power to the heater to remove a material attached onto the heater, when removal of the aerosol generating article is detected.

15. The aerosol generating device of claim 13, wherein the processor supplies power to the heater to remove a material attached onto the heater after a designated time has passed from when removal of the aerosol generating article is detected.

* * * * *